United States Patent
Tanaka et al.

(10) Patent No.: US 10,242,608 B2
(45) Date of Patent: Mar. 26, 2019

(54) VEHICLE DISPLAY APPARATUS DISPLAYING AN ILLUSION IMAGE BASED ON DRIVER BEHAVIOR

(71) Applicant: DENSO CORPORATION, Kariya, Aichi-pref. (JP)

(72) Inventors: Kimiaki Tanaka, Kariya (JP); Akira Kamiya, Kariya (JP); Kazumi Hayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 28 days.

(21) Appl. No.: 15/129,968

(22) PCT Filed: Mar. 19, 2015

(86) PCT No.: PCT/JP2015/001536
§ 371 (c)(1),
(2) Date: Sep. 28, 2016

(87) PCT Pub. No.: WO2015/151438
PCT Pub. Date: Oct. 8, 2015

(65) Prior Publication Data
US 2017/0154554 A1 Jun. 1, 2017

(30) Foreign Application Priority Data
Mar. 31, 2014 (JP) .................. 2014-073788

(51) Int. Cl.
*G09G 3/00* (2006.01)
*B60K 35/00* (2006.01)
(Continued)

(52) U.S. Cl.
CPC .............. *G09G 3/002* (2013.01); *B60K 35/00* (2013.01); *B60R 1/00* (2013.01); *G02B 27/01* (2013.01);
(Continued)

(58) Field of Classification Search
CPC ........ G09G 3/002; G09G 3/36; G09G 3/3648; G09G 2380/10; G09G 2380/20;
(Continued)

(56) References Cited

U.S. PATENT DOCUMENTS

2008/0055192 A1* 3/2008 Nagano .................. G02B 27/01
345/7
2009/0005961 A1* 1/2009 Grabowski .......... G01C 21/365
701/532
(Continued)

FOREIGN PATENT DOCUMENTS

GB 2315794 A * 2/1998 ................ E01F 9/50
JP 2005162154 A 6/2005
(Continued)

*Primary Examiner* — Alexander Eisen
*Assistant Examiner* — Nelson Lam
(74) *Attorney, Agent, or Firm* — Harness, Dickey & Pierce, P.L.C.

(57) ABSTRACT

A vehicle display control apparatus mounted on a vehicle includes a display control portion that controls a head-up display device displaying an image by superimposing the image on a view visible to a driver of the vehicle through a windshield of the vehicle, and a condition determination portion that determines whether a condition under which the vehicle should slow down is satisfied. The display control portion causes, based on a determination of the condition determination portion that the condition is satisfied, the head-up display device to display an object that does not actually exist on a road under circumstances where the condition is satisfied, as an illusion image that produces an optical illusion appearing that a road surface viewed from the driver flows faster than an actual speed in an opposite direction to a travel direction by superimposing the illusion image on the view.

6 Claims, 20 Drawing Sheets

(51) Int. Cl.
*G02B 27/01* (2006.01)
*G06K 9/00* (2006.01)
*G08G 1/0962* (2006.01)
*G08G 1/16* (2006.01)
*B60R 1/00* (2006.01)
*G09B 19/14* (2006.01)

(52) U.S. Cl.
CPC ..... *G02B 27/0101* (2013.01); *G06K 9/00798* (2013.01); *G06K 9/00805* (2013.01); *G06K 9/00818* (2013.01); *G08G 1/09623* (2013.01); *G08G 1/166* (2013.01); *G08G 1/167* (2013.01); *G09B 19/14* (2013.01); *B60K 2350/2052* (2013.01); *B60K 2350/352* (2013.01); *B60R 2300/205* (2013.01); *B60R 2300/308* (2013.01); *B60R 2300/804* (2013.01); *B60R 2300/8093* (2013.01); *G02B 2027/014* (2013.01); *G02B 2027/0141* (2013.01); *G06K 9/00825* (2013.01); *G09G 2360/10* (2013.01); *G09G 2380/10* (2013.01)

(58) Field of Classification Search
CPC .............. G09G 3/003; B60R 2300/205; B60R 2300/308; G02B 27/01; G02B 27/0101; G06K 9/00798
USPC ...................... 345/7–9; 359/13–15, 630–632
See application file for complete search history.

(56) References Cited

U.S. PATENT DOCUMENTS

| | | | |
|---|---|---|---|
| 2009/0113772 A1* | 5/2009 | Traupianski | G09F 19/14 40/446 |
| 2009/0135092 A1* | 5/2009 | Uematsu | G02B 27/0101 345/7 |
| 2010/0164702 A1* | 7/2010 | Sasaki | G01B 21/22 340/438 |
| 2011/0001639 A1* | 1/2011 | Sasaki | G02B 27/0101 340/995.19 |
| 2011/0301813 A1* | 12/2011 | Sun | B62D 15/029 701/41 |
| 2012/0235805 A1* | 9/2012 | Nogami | G06T 7/215 340/441 |
| 2013/0141250 A1* | 6/2013 | Mathieu | B60K 35/00 340/901 |
| 2016/0147073 A1* | 5/2016 | Onda | G02B 27/01 345/7 |
| 2016/0313562 A1* | 10/2016 | Saisho | G02B 27/0179 |
| 2016/0327402 A1* | 11/2016 | Funabiki | G01C 21/365 |
| 2017/0213092 A1* | 7/2017 | Sugama | G06T 7/13 |
| 2018/0058879 A1* | 3/2018 | Tayama | B60K 35/00 |
| 2018/0148072 A1* | 5/2018 | Kamiya | G06K 9/0061 |

FOREIGN PATENT DOCUMENTS

| | | |
|---|---|---|
| JP | 2006031618 A | 2/2006 |
| JP | 4389708 B2 | 12/2009 |
| JP | 2012006469 A | 1/2012 |

* cited by examiner

Ob3   Ob3
              PE

| EXCESS SPEED | LESS THAN 10 km/h | 10 km/h OR MORE AND LESS THAN 15 km/h | 15 km/h OR MORE |
|---|---|---|---|
| INTERVAL BETWEEN THREE-DIMENSIONAL GUIDELINES | 3m | 2.5m | 2m |

VEHICLE DISPLAY APPARATUS DISPLAYING AN ILLUSION IMAGE BASED ON DRIVER BEHAVIOR

CROSS REFERENCE TO RELATED APPLICATIONS

This application is a U.S. National Phase Application under 35 U.S.C. 371 of International Application No. PCT/JP2015/001536 filed on Mar. 19, 2015 and published in Japanese as WO 2015/151438 A1 on Oct. 8, 2015. This application is based on and claims the benefit of priority from Japanese Patent Application No. 2014-073788 filed on Mar. 31, 2014. The entire disclosures of all of the above applications are incorporated herein by reference.

TECHNICAL FIELD

The present disclosure relates to a vehicle display control apparatus causing an image to be displayed on a windshield by using a head-up display device.

BACKGROUND ART

Conventionally, a head-up display device (hereinafter, abbreviated to HUD) displays an image by superimposing the image on a view visible to a driver of a vehicle through a windshield of the vehicle.

For example, Patent Literature 1 discloses a technique of displaying a mark representing a sign at a sight position where the sign is expected to appear with the use of a HUD when a vehicle comes near a point a predetermined distance away from the sign and also displaying guidance information the sign provides at a position lower than a reference visual line of a driver.

Regarding a vehicle display control apparatus, the inventors of the present application have found that sings include warning sings requiring a driver to decelerate and regulatory signs instructing a driver to stop before proceeding, and that while the technique disclosed in Patent Literature 1 may make it easier for a driver to notice such signs, the driver does not necessarily behave as the driver is supposed to according to the sings.

PRIOR ART LITERATURE

Patent Literature

Patent Literature 1: JP 2012-6469 A

SUMMARY OF INVENTION

It is an object of the present disclosure to provide a vehicle display control apparatus successfully leading a driver to a desirable behavior for road traffic by using a head-up display device.

According to one aspect of the present disclosure, a vehicle display control apparatus mounted on a vehicle is provided with a display control portion that controls a head-up display device displaying an image by superimposing the image on a view visible to a driver of the vehicle through a windshield of the vehicle. The vehicle display control apparatus is provided with a condition determination portion that determines whether a predetermined condition is satisfied. The display control portion causes, based on a determination of the condition determination portion that the predetermined condition is satisfied, the head-up display device to display an object that does not actually exist on a road under circumstances where the predetermined condition is satisfied, as an illusion image by superimposing the illusion image on the view visible to the driver through the windshield.

An optical illusion is a visual trick, and a driver normally responds instinctively to an optical illusion produced by an illusion image. In addition, the illusion image is superimposed and displayed on a view visible to the driver through the windshield by the head-up display device. Hence, the driver feels as if the optical illusion produced by a visual trick were real and responds instinctively.

Hence, by displaying an object which does not actually exist on a road under circumstances where a predetermined condition is satisfied as an illusion image when the predetermined condition is satisfied, the driver who sees the illusion image cannot help but behave instinctively in a desirable manner for road traffic under circumstances where the predetermined condition is satisfied. The driver is thus successfully led to a desirable behavior for road traffic with the use of the head-up display device.

BRIEF DESCRIPTION OF DRAWINGS

The above and other aspects, features and advantages of the present disclosure will become more apparent from the following detailed description made with reference to the accompanying drawings. In the drawings.

PREFERRED EMBODIMENTS FOR CARRYING OUT INVENTION

First Embodiment (Schematic Configuration of Drive Assist System 100)

Figure 1:
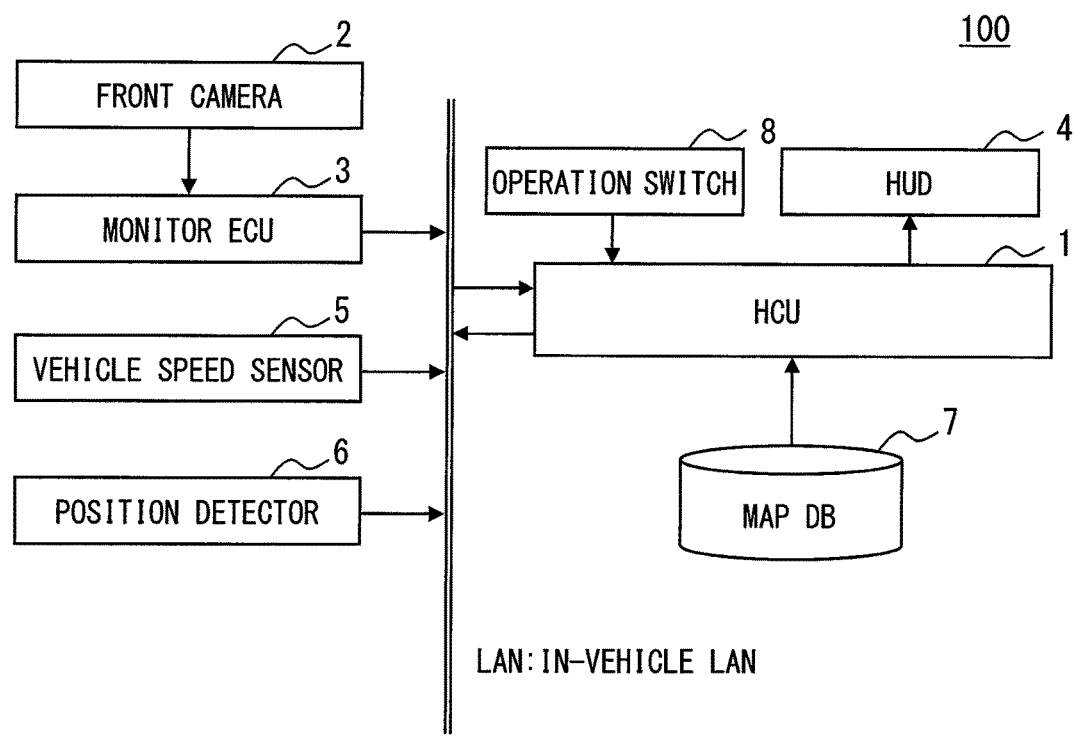
FIG. 1 is a block diagram showing a schematic configuration of a drive assist system.

FIG. 1 is a view showing an example of a schematic configuration of a drive assist system 100 to which a vehicle display control apparatus of the present disclosure is applied. As is shown in FIG. 1, the drive assist system 100 includes an HCU (Human Machine Interface Control Unit) 1, a front camera 2, a monitor ECU 3, a HUD (Head-Up Display) 4, a vehicle speed sensor 5, a position detector 6, a map database (DB) 7, and an operation switch group 8. For example, the HCU 1 is connected to the monitor ECU 3, the HUD 4, and the vehicle speed sensor 5 via an in-vehicle LAN. Hereinafter, a vehicle equipped with the drive assist system 100 is referred to as the subject vehicle (also referred to as an own vehicle).

The front camera 2 is installed to the subject vehicle and captures an image of a region spreading ahead of the subject vehicle within a predetermined angle range. The front camera 2 is set with an optical axis facing a road surface and therefore captures an image of the road surface ahead of the subject vehicle. The monitor ECU 3 detects a speed limit value indicated by a speed limit sign and a maximum speed limit sign, lane boundaries of a lane the subject vehicle is travelling, a stop line, a pedestrian crossing, or the like from an image captured by the front camera 2 using a known image-recognition technique.

The HUD 4 is a head-up display device which projects a display image formed on a TFT liquid crystal panel onto a windshield of the subject vehicle so that the display image is displayed as a virtual image visible from inside the subject vehicle. The virtual image displayed by the HUD 4 is superimposed on a landscape ahead of the vehicle and therefore visually confirmed by a driver. In other words, the HUD 4 displays an image by superimposing the image on a view visible to the driver of the subject vehicle through the windshield of the subject vehicle. Hereinafter, a display image projected onto the windshield by the HUD 4 is referred to as a HUD image.

The HUD 4 is not necessarily of a configuration using a TFT liquid crystal panel as a display element and a laser element may be used. The HUD 4 only has to display an image by superimposing the image on a view visible to the driver of the vehicle through the windshield. Hence, the HUD 4 is not necessarily of a type that projects a display image onto the windshield and may be of a type that projects a display image onto a transparent or translucent panel provided on an inner side to the driver than the windshield.

A projection surface on the windshield onto which to project a HUD image is preferably located below a drive sight region that should be ensured while the driver is driving with the aim of lessening a refocusing load of the driver by reducing an amount of movement of a driver's visual line.

The vehicle speed sensor 5 detects a speed of the subject vehicle. The position detector 6 successively detects a present location of the subject vehicle by using a positioning system which detects a present location of the subject vehicle on the basis of an electric wave from a positioning satellite. A present location of the subject vehicle may be indicated by, for example, latitude and longitude coordinates.

The map DB 7 stores in advance map data including road data made up of node data and link data. A link referred to herein connects one node to another when each road on an electronic map is divided by multiple nodes such as points at which roads intersect, branch, or merge.

The link data is made up of data of a link ID, a link length, a link direction, shape information of the link, node coordinates (latitude and longitude) at a beginning and an end of the link, and road attributes. The road attributes include a name of a road, a type of the road, a width of the road, the number of lanes, a speed limit value, or the like. The node data is made up of data of a node ID, node coordinates, a name of the node, a type of the node, the presence or absence of a stop-before-proceeding regulation, and the presence or absence of a signal.

The operation switch group 8 includes, for example, mechanical switches provided on the periphery of a steering wheel. The operation switch group 8 is operated by the driver when the driver makes various settings.

The HCU 1 is formed of a microcomputer and includes known components, namely a CPU, a memory represented by an electrically-rewritable, non-volatile memory element (for example, an EEPROM) such as a ROM and a RAM, an I/O, and a bus interconnecting the foregoing components. The HCU 1 performs various types of processing, such as display control related processing, by which a display image to be projected using the HUD 4 is generated on the basis of various types of information inputted from the monitor ECU 3, the vehicle speed sensor 5, the position detector 6, the map DB 7, and the operation switch group 8 and the HUD 4 is controlled to project the display image. The HCU 1 corresponds to a vehicle display control apparatus of the present disclosure.

A part or all of functions performed by the HCU 1 may be realized by hardware using a single or multiple ICs or the like.

(Detailed Configuration of HCU 1)

Figure 2:
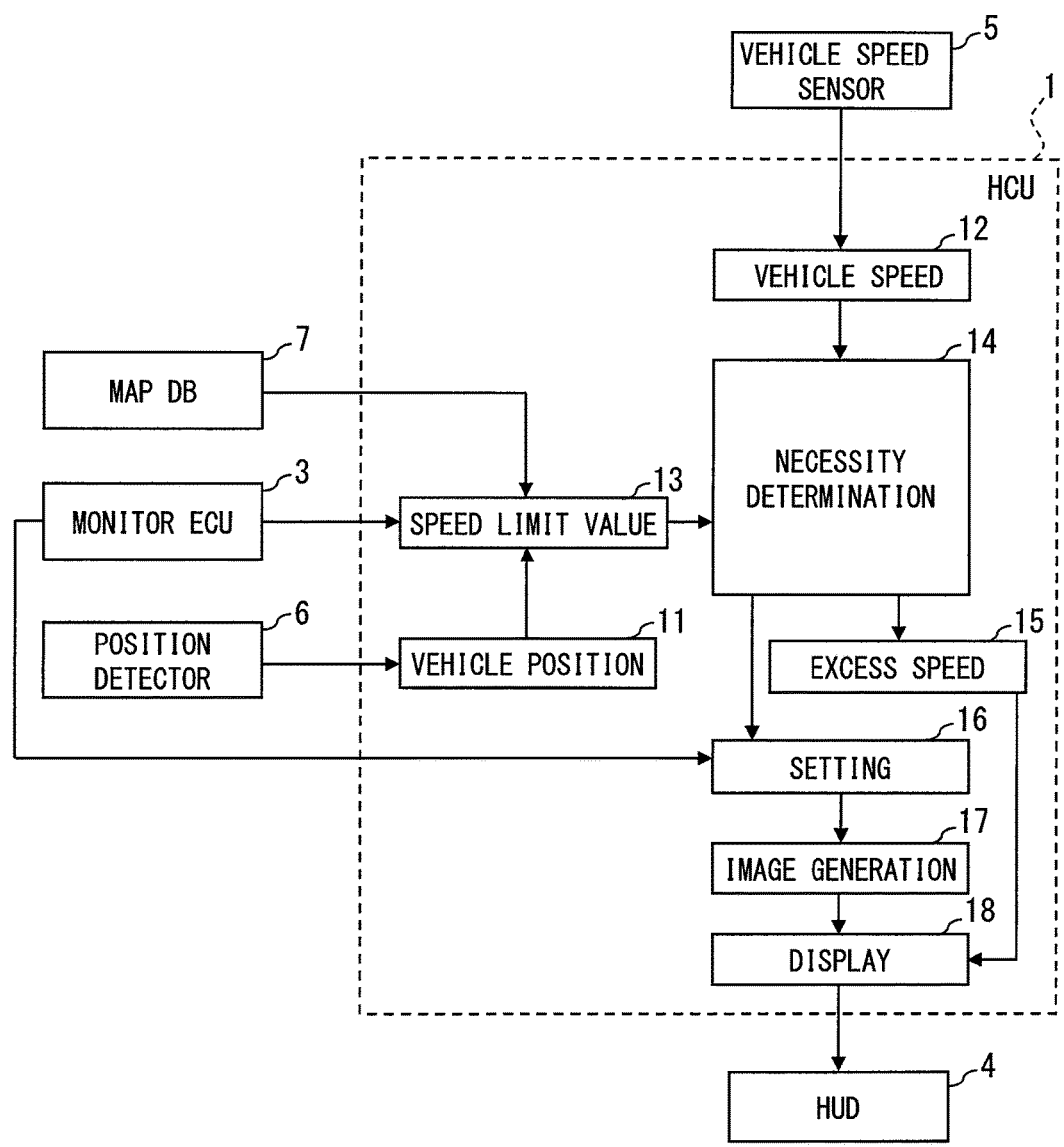
FIG. 2 is a block diagram showing a schematic configuration of an HCU of a first embodiment.

As is shown in FIG. 2, the HCU 1 includes a subject vehicle position specifying portion 11, a vehicle speed specifying portion 12, a speed limit value specifying portion 13, a necessity determination portion 14, an excess speed calculation portion 15, a pre-generation setting portion 16, an image generation portion 17, and a display control portion 18.

The subject vehicle position specifying portion 11 specifies a location detected by the position detector 6 as a present location of the subject vehicle. The vehicle speed specifying portion 12 specifies a vehicle speed of the subject vehicle on the basis of a signal from the vehicle speed sensor 5. The speed limit value specifying portion 13, the necessity determination portion 14, the excess speed calculation portion 15, the pre-generation setting portion 16, the image generation portion 17, and the display control portion 18 will be described in detail in a description of the display control related processing in the following.

(Display Control Related Processing of First Embodiment)

The display control related processing by the HCU 1 of the first embodiment will now be described using a flowchart of FIG. 3. The flowchart of FIG. 3 starts, for example, when an ignition power supply of the subject vehicle is turned ON.

Firstly in S1, the speed limit value specifying portion 13 specifies a speed limit value (that is, a legal speed limit value) of a road the subject vehicle is travelling. For example, when the monitor ECU 3 succeeded in detecting a legal speed limit value indicated by a speed limit sign or a maximum speed limit sign, the speed limit value specifying portion 13 specifies the detected speed limit value as a speed limit value of the road the subject vehicle is travelling. Alternatively, when the monitor ECU 3 succeeded in obtaining a speed limit value of a link on which the subject vehicle is located on the basis of a present location of the subject vehicle specified by the subject vehicle position specifying portion 11 and the link data stored in the map DB 7, the speed limit value specifying portion 13 specifies the obtained speed limit value as a speed limit value of the road the subject vehicle is travelling. In a case where no speed limit value is provided to the link on which the subject vehicle is located, the speed limit value specifying portion 13 fails to obtain a speed limit value of the link on which the subject vehicle is located.

When the speed limit value specifying portion 13 succeeds in specifying a speed limit value of the road the subject vehicle is travelling (YES in S1), advancement is made to S2. On the other hand, when the speed limit value specifying portion 13 fails to specify a speed limit value (NO in S1), advancement is made to S9.

In S2, the necessity determination portion 14 determines whether a vehicle speed of the subject vehicle specified by the vehicle speed specifying portion 12 is over the speed limit value specified in S1. When the necessity determination portion 14 determines that the vehicle speed is not over the speed limit value (YES in S2), advancement is made to S3. On the other hand, when the necessity determination portion 14 determines that the vehicle speed is not over the speed limit value (NO in S2), advancement is made to S9. For example, when a vehicle speed of the subject vehicle specified by the vehicle speed specifying portion 12 is 50 km/h and the speed limit value specified in S1 is 40 km/h, the necessity determination portion 14 determines that the vehicle speed is over the speed limit value. S2 corresponds to a condition determination portion of the present disclosure.

In S3, the excess speed calculation portion 15 calculates an excess speed above the speed limit value by subtracting the speed limit value specified in S1 from the vehicle speed of the subject vehicle specified by the vehicle speed specifying portion 12. For example, when the vehicle speed of the subject vehicle specified by the vehicle speed specifying portion 12 is 50 km/h and the speed limit value specified in S1 is 40 km/h, an excess speed above the speed limit value is found to be 10 km/h. The excess speed calculation portion 15 corresponds to a slowdown degree specifying portion of the present disclosure.

In S4, the pre-generation setting portion 16 makes settings to display a linear mark illusion image that produces an optical illusion which appears that a road surface viewed from the driver flows faster than an actual speed in an opposite direction to a travel direction. In the present embodiment, the settings are made as follows by way of example.

Firstly, on the basis of regions detected by the monitor ECU 3 as lane boundaries of a lane the subject vehicle is travelling in an image captured by the front camera 2, the pre-generation setting portion 16 specifies regions where the lane boundaries are presumed to be visible to the driver within a display region of a HUD image projected onto the projection surface on the windshield (hereinafter, the specified regions are referred to as the presumed lane boundary regions). Herein, assume that a correlation between positions in the image captured by the front camera 2 and positions at which the lane boundaries are presumed to be visible to the driver through the projection surface is in advance found by a simulation or the like. The pre-generation setting portion 16 specifies the presumed lane boundary regions by using the preliminarily found correlation and sets the presumed lane boundary regions thus specified as a reference position at which linear marks are displayed.

Figure 4:
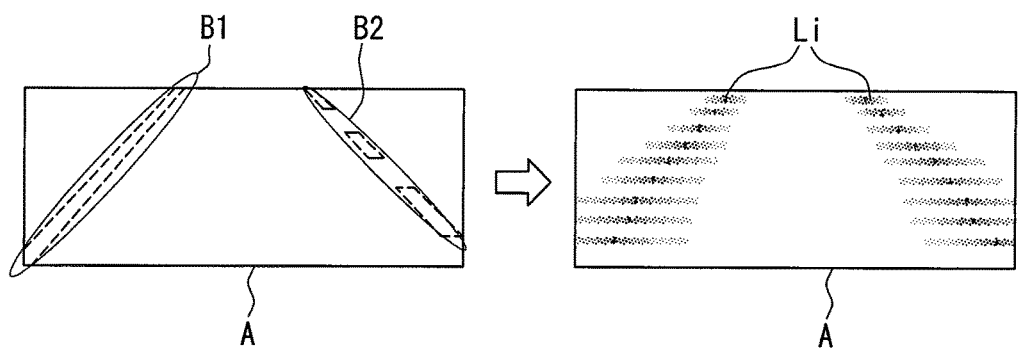
FIG. 4 is a schematic view showing an example of presumed lane boundary regions and a linear mark illusion image.

An example of the presumed lane boundary regions is shown in FIG. 4. In FIG. 4, A indicates a display region of a HUD image projected onto the projection surface on the windshield, and B1 and B2 indicate the presumed lane boundary regions corresponding to the lane boundaries, respectively, on left and right sides of the subject vehicle.

In S5, the image generation portion 17 generates a linear mark illusion image on the presumed lane boundary regions specified in S4. In the linear mark illusion image, linear marks each extending in a vehicle width direction of the subject vehicle are aligned intermittently in a direction in which the presumed lane boundary regions extend. The linear mark illusion image will be described in detail using FIG. 4. In FIG. 4, Li indicates linear marks in the linear mark illusion image.

As is shown in FIG. 4, the linear marks in the linear mark illusion image are aligned intermittently on the presumed lane boundary regions in such a manner that a length in the vehicle width direction becomes shorter as the linear marks move toward a ceiling of the subject vehicle when projected onto the projection surface on the windshield. Also, as is shown in FIG. 4, each linear mark becomes lighter in color from a center to ends in the vehicle width direction. The linear marks may be displayed in, for example, blue or white, or in any other color. In addition, processing to confer transparency to the linear marks is applied to the linear mark illusion image by, for example, known alpha blending.

Figure 5:
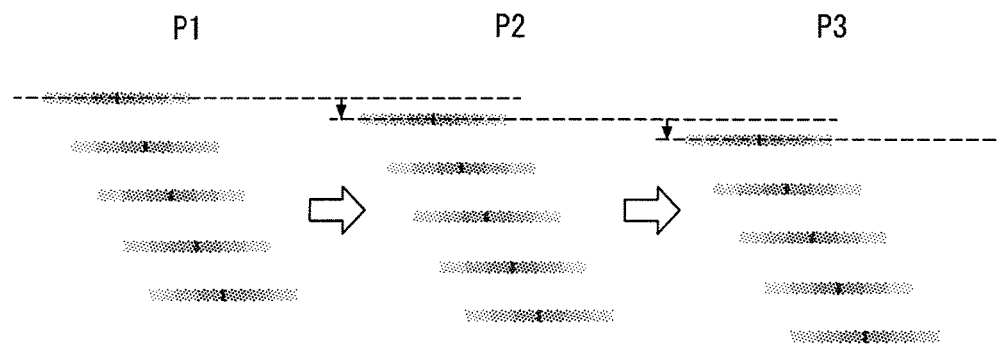
FIG. 5 is a schematic view used to describe an example of a method of displaying linear marks appearing that the linear marks are in motion.

Further, the image generation portion 17 generates multiple patterns of the linear mark illusion image so as to display the linear marks appearing that the linear marks are in motion. More specifically, as is shown in FIG. 5, the image generation portion 17 generates multiple patterns of the linear mark illusion image (see P1 through P3 of FIG. 5) by slightly shifting a position of the linear marks in the direction in which the linear marks are aligned (hereinafter, the position is referred to as the aligned position). FIG. 5 shows a case where three patterns are used. It should be appreciated, however, that four or more patterns or two patterns may be used instead.

In S6, the display control portion 18 sends the linear mark illusion image generated in S5 by the image generation portion 17 to the HUD 4 and directs the HUD 4 to display the linear mark illusion image. The linear mark illusion image, when projected onto the windshield of the subject vehicle by the HUD 4, is superimposed and displayed translucently on a view visible to the driver of the vehicle.

Also, the display control portion 18 directs the HUD 4 to sequentially and repetitively display the multiple patterns of the linear mark illusion image generated at the aligned positions slightly shifted from one another. More specifically, the display control portion 18 directs the HUD 4 to sequentially display patterns P1, P2, and P3 of FIG. 5 in repetition. Consequently, when the linear mark illusion image is superimposed and displayed on a view visible to the driver of the subject vehicle through the windshield, the linear marks can be displayed as if the linear marks were flowing in an opposite direction to a travel direction of the subject vehicle.

As to a cycle in which the multiple patterns of the linear mark illusion image generated at the aligned positions slightly shifted from one another are sequentially displayed in repetition (hereinafter, the cycle is referred to as the display cycle), the display control portion 18 sets the display cycle in such a manner that it appears that the linear marks are flowing at a speed higher than an actual speed at which the road surface seems to flow in an opposite direction to the travel direction of the subject vehicle. For example, a correlation between the display cycle which makes it appear that the linear marks flow at a speed higher than an actual speed at which the road surface seems to flow in an opposite direction to the travel direction of the subject vehicle and a vehicle speed of the subject vehicle is found in advance by tests or the like and stored in advance in the non-volatile memory of the HCU 1. The display control portion 18 thus sets the display cycle which makes it seem as if the linear marks were flowing at a speed higher than an actual speed at which the road surface seems to flow in an opposite direction to the travel direction of the of the subject vehicle on the basis of the pre-stored correlation and a vehicle speed of the subject vehicle specified by the vehicle speed specifying portion 12.

Further, the display control portion 18 sets the display cycle shorter as an excess speed calculated in S3 becomes larger. Consequently, the linear marks are displayed as if the linear marks were flowing in an opposite direction to the travel direction of the subject vehicle at a higher speed as an excess speed above the speed limit value becomes larger.

Furthermore, the display control portion 18 superimposes an image indicating a speed of the subject vehicle on the linear mark illusion image and sends the resulting linear mark illusion image to the HUD 4 so that the speed of the subject vehicle is also projected on the windshield with the linear mark illusion image. The speed of the subject vehicle projected herein is a value specified by the vehicle speed specifying portion 12.

Figure 6:
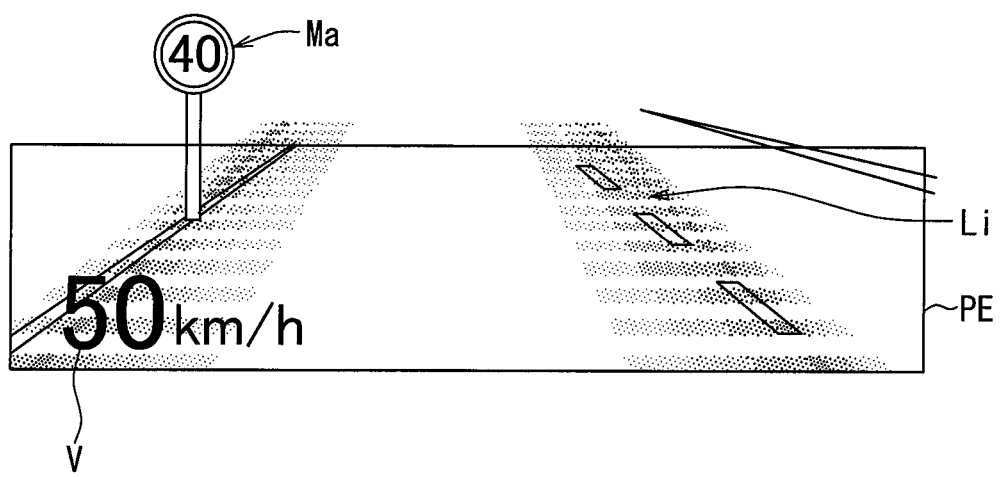
FIG. 6 is a schematic view showing a display example of the linear mark illusion image.

A description will be given using FIG. 6 as to in which manner the linear mark illusion image is displayed when projected onto the windshield by the HUD 4 according to the processing in S6. FIG. 6 is a schematic view showing a view in front of the driver of the subject vehicle. In FIG. 6, Ma indicates a speed limit sign, PE indicates the projection surface on which the linear mark illusion image is projected, Li indicates the linear marks, and V indicates a speed of the subject vehicle.

The linear marks are aligned in such a manner that a length in the vehicle width direction becomes shorter as the linear marks move toward the ceiling of the subject vehicle in the projection surface on the windshield. Hence, when superimposed and displayed on a view in front of the driver of the subject vehicle, as is shown in FIG. 6, it seems to the driver as if the linear marks are aligned along the actual road surface in the travel direction of the subject vehicle.

Herein, multiple patterns of the linear mark illusion image generated at the aligned positions slightly shifted from one another are sequentially displayed in repetition. Hence, it appears to the driver that the linear marks are aligned along the actual road surface in the travel direction of the subject vehicle and flowing at a speed higher than an actual speed at which the road surface seems to flow in an opposite direction to the travel direction of the subject vehicle.

Figure 7:
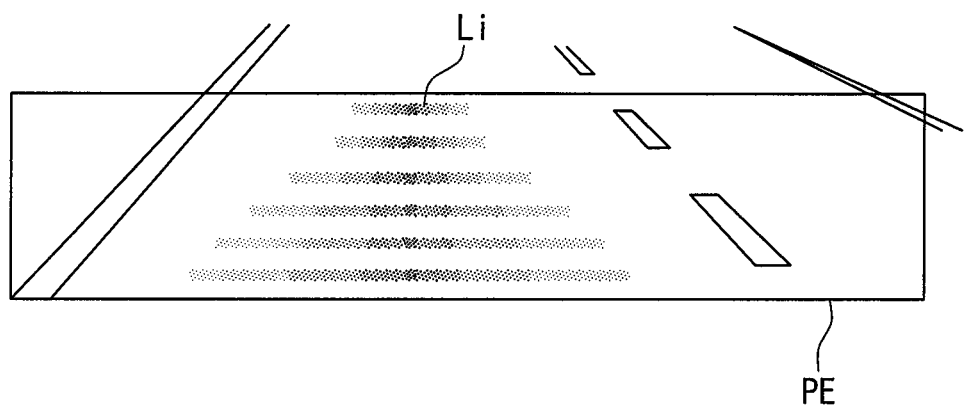
FIG. 7 is a schematic view showing another display example of the linear mark illusion image.

The linear mark illusion image is not limited to the configuration to display the linear marks as if the linear marks were aligned on the lane boundaries of the lane the subject vehicle is travelling. Alternatively, as is shown in FIG. 7, the linear mark illusion image may be configured so as to display the linear marks as if the linear marks were aligned between the lane boundaries on the right and left sides of the subject vehicle. In FIG. 7, PE indicates the projection surface on which the linear mark illusion image is projected and Li indicates the linear marks.

Figure 3:
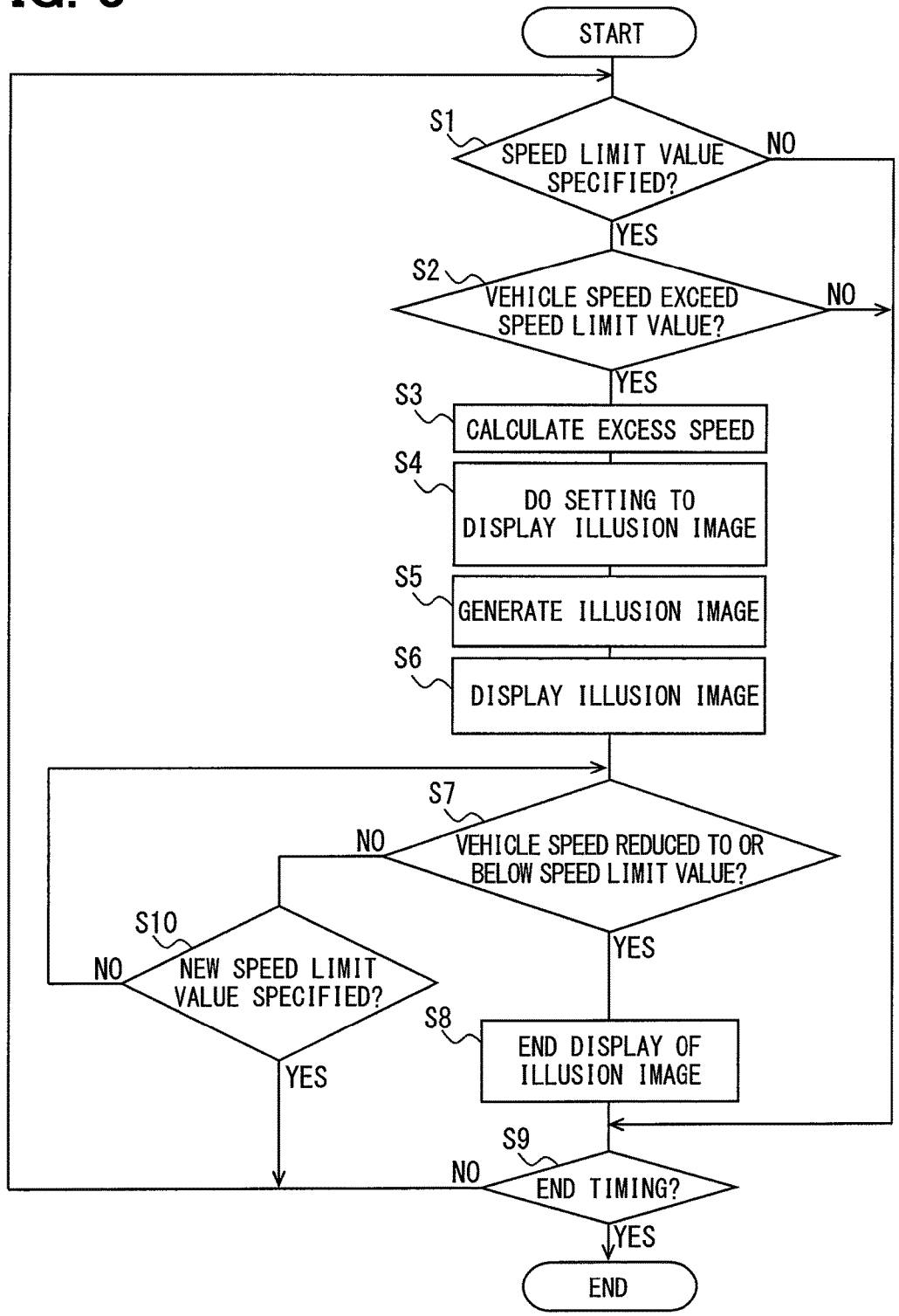
FIG. 3 is a flowchart depicting an example of a flow of display control related processing by the HCU of the first embodiment.

Referring to FIG. 3, the necessity determination portion 14 determines in S7 whether a vehicle speed of the subject vehicle specified by the vehicle speed specifying portion 12 is reduced to or below the speed limit value specified in S1. In other words, the necessity determination portion 14 continues the processing to determine whether the driver decelerates the subject vehicle until the vehicle speed is reduced to or below the speed limit value of the road the subject vehicle is travelling. When the necessity determination portion 14 determines that the vehicle speed is reduced to or below the speed limit value (YES in S7), advancement is made to S8. On the other hand, when the necessity determination portion 14 determines that the vehicle speed is not reduced to or below the speed limit value (NO in S7), advancement is made to S10. S7 corresponds to a behavior determination portion of the present disclosure.

In S8, the display control portion 18 ends a display of the linear mark illusion image by directing the HUD 4 to end the display of the linear mark illusion image.

When a determination is made in S9 that it is timing to end the display control related processing (YES in S9), the display control related processing is ended. On the other hand, when it is not timing to end the display control related processing (NO in S9), the flow is returned to S1 to repeat the processing. An example of the timing to end the display control related processing is when the ignition power supply of the subject vehicle is turned OFF.

In S10 to which advancement is made when the necessity determination portion 14 determines in S7 that the vehicle speed is not reduced to or below the speed limit value, the speed limit value specifying portion 13 specifies a speed limit value of the road the subject vehicle is travelling. When the speed limit value specifying portion 13 specifies a new speed limit value different from the speed limit value specified before (YES in S10), the flow is returned to S1 to repeat the processing. On the other hand, when the speed limit value specifying portion 13 specifies a speed limit value same as the speed limit value specified before or fails to specify the speed limit value itself (NO in S10), the speed limit value specifying portion 13 maintains the speed limit value specified before and the flow is returned to S7 to repeat the processing.

Herein, assume that the driver is able to switch from a mode to display an illusion image to a mode not to display an illusion image and vice versa by operating the operation switch group 8. The same applies to embodiments other than the first embodiment. An illusion image can be described also as an image that produces an optical illusion leading the driver to a desirable behavior on road traffic under circumstances where a predetermined condition is satisfied.

A desirable behavior for road traffic may be also called a predetermined vehicle drive behavior.

(Outline of First Embodiment)

According to the first embodiment, the linear mark illusion image is displayed and appears that the linear marks flow at a speed higher than an actual speed at which the road surface seems to flow in an opposite direction to the travel direction of the subject vehicle, and such an illusion image is superimposed and displayed on a view visible to the driver through the windshield when the subject vehicle exceeds a speed limit value.

When it appears that the linear marks flow at a speed higher than an actual speed at which the road surface seems to flow in an opposite direction to the travel direction of the subject vehicle, the driver has an optical illusion appearing that the subject vehicle moves faster than an actual speed. Normally, the driver is more likely to decelerate the subject vehicle instinctively as the driver feels that the subject vehicle is moving faster. Hence, the driver who sees an optical illusion produced by the linear mark illusion image appearing that the subject vehicle moves faster than an actual speed is highly likely to decelerate the subject vehicle instinctively. Hence, according to the first embodiment, the driver is successfully led to decelerate the subject vehicle when the subject vehicle exceeds a speed limit value.

Also, according to the first embodiment, the linear mark illusion image is not displayed when the subject vehicle complies with the speed limit value or is decelerated to or below the speed limit value. Hence, the first embodiment can eliminate annoyance the driver may feel with the linear mark illusion image displayed even when the subject vehicle complies with the speed limit value.

Further, according to the first embodiment, the linear mark illusion image is displayed as if the linear marks were flowing in an opposite direction to the travel direction of the subject vehicle at a higher speed as an excess speed of the subject vehicle above a speed limit value becomes larger. The driver is expected to decelerate the subject vehicle more drastically when it appears that the linear marks flow in an opposite direction to the travel direction of the subject vehicle at a higher speed. Hence, the driver is successfully led to decelerate the subject vehicle more drastically as an excess speed of the subject vehicle above a speed limit value becomes larger.

(First Modification)

It should be appreciated that the present disclosure is not limited to the above embodiment and a first modification in the following is also included in the technical scope of the present disclosure. Hereinafter, the first modification will be described. For ease of description, members furnished with the same functions as the members shown in the drawings used in the description of the embodiment above are labeled with same reference numerals and a description is not repeated in the first modification and subsequent modifications and embodiments below.

A drive assist system 100 of the first modification is the same as the drive assist system 100 of the first embodiment except that the linear mark illusion image is displayed when the subject vehicle reaches a point at which the subject vehicle should slow down instead of displaying the linear mark illusion image when the subject vehicle exceeds a speed limit value. The first modification and the first embodiment are same except for a part of the processing by the HCU 1.

Figure 8:
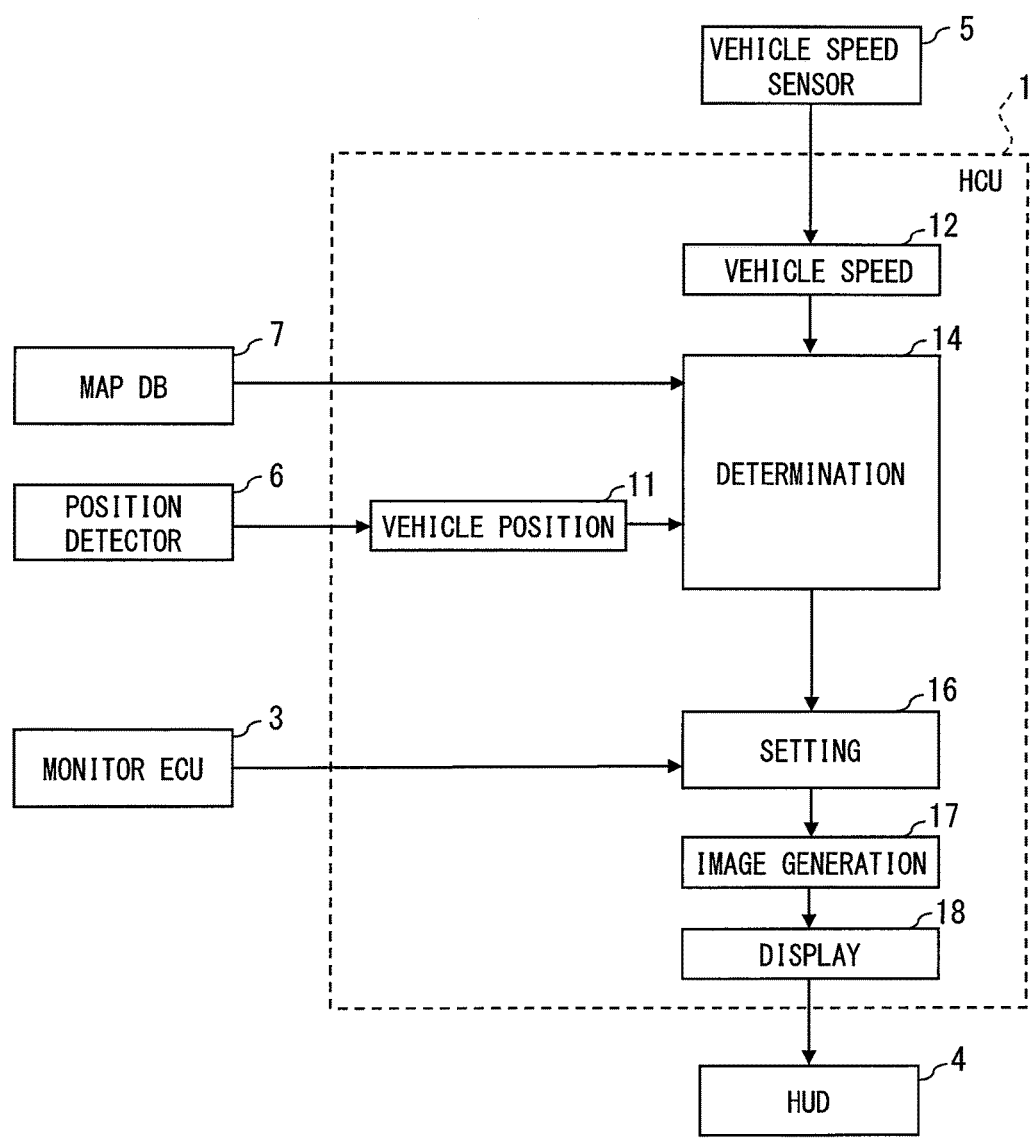
FIG. 8 is a block diagram showing a schematic configuration of an HCU of a first modification.

As is shown in FIG. 8, an HCU 1 of the first modification only has to include a subject vehicle position specifying portion 11, a vehicle speed specifying portion 12, a necessity determination portion 14, a pre-generation setting portion 16, an image generation portion 17, and a display control portion 18.

(Display Control Related Processing of First Modification)

Figure 9:
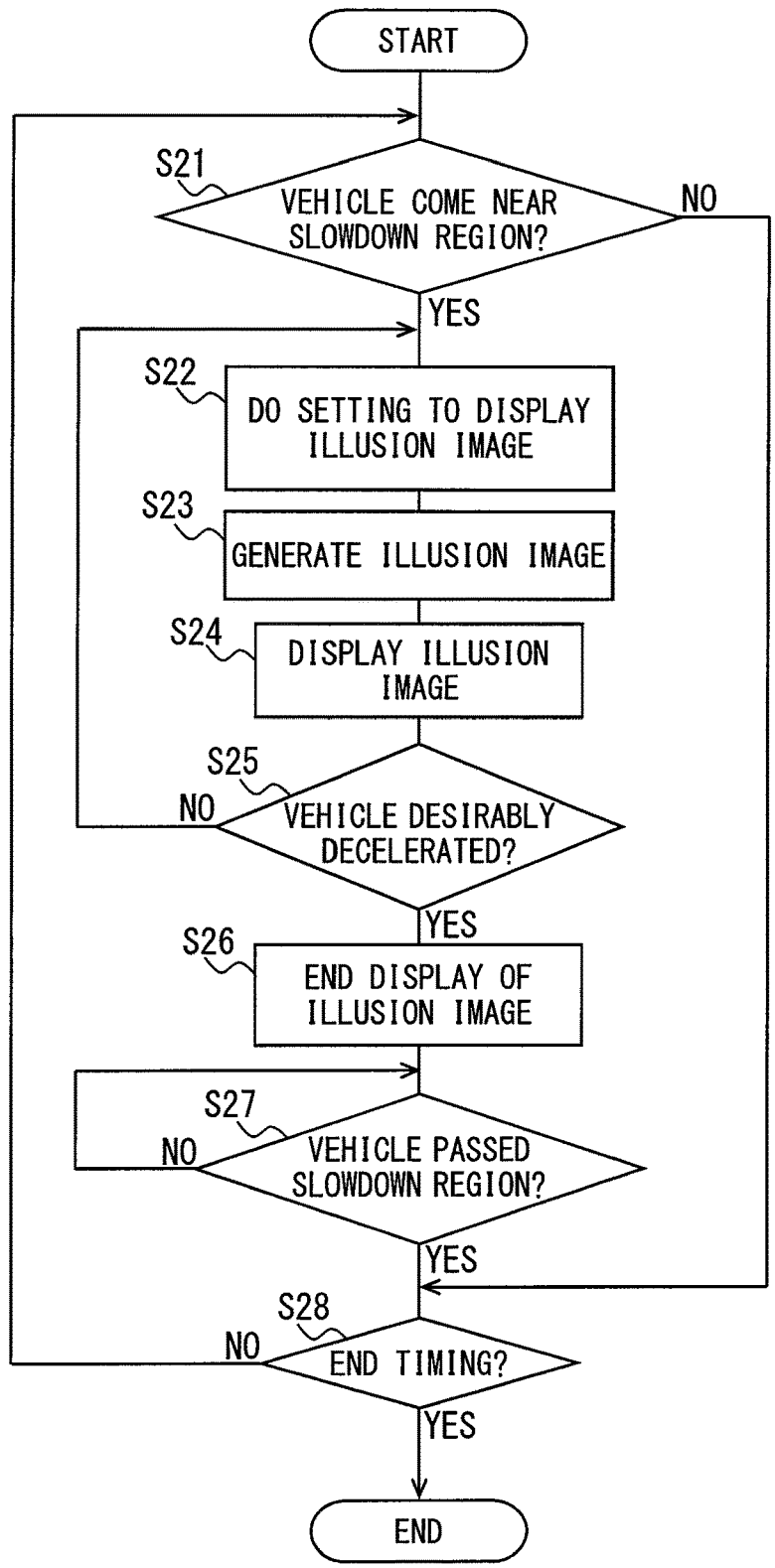
FIG. 9 is a flowchart depicting an example of a flow of display control related processing by the HCU of the first modification.

Display control related processing by the HCU 1 of the first modification will now be described using a flowchart of FIG. 9. The flowchart of FIG. 9 starts, for example, when the ignition power supply of the subject vehicle is turned ON.

Firstly in S21, the necessity determination portion 14 determines whether the subject vehicle comes near a region where the subject vehicle should slow down (hereinafter, the region is referred to as the slowdown region) on the basis of a present location of the subject vehicle specified by the subject vehicle position specifying portion 11 and the road data stored in the map DB 7. Herein, "come near" means, for example, a case where a distance from the subject vehicle to the slowdown region becomes as short as or shorter than a preset distance, for example, 100 meters.

Examples of the slowdown region include a node with a stop-before-proceeding regulation, a link immediately after an end of a tunnel, and a link on a narrow road having a width of, for example, less than 4 meters. Also, examples may include a link registered as a zone where careful driving is required such as an icy road, a high-accident road. Further, examples may include a link on a school zone which is set as a point at which the subject vehicle should slow down during predetermined hours. When the predetermined hours are set, it may be configured in such a manner that the link is deemed as a region where the subject vehicle should slow down only during the predetermined hours by using a timer circuit (not shown) or the like.

When the necessity determination portion 14 determines that the subject vehicle comes near the slowdown region (YES in S21), advancement is made to S22. On the other hand, when the necessity determination portion 14 determines that the subject vehicle does not come near the slowdown region (NO in S21), advancement is made to S27. S21 corresponds to a condition determination portion of the present disclosure.

Processing in S22 through S24 is the same as the processing in S4 through S6 of the first embodiment. It should be noted, however, that an excess speed above a speed limit value is not calculated in the first modification, and therefore processing to address an excess speed above the speed limit value is not performed in S24.

In S25, the necessity determination portion 14 determines whether the subject vehicle is decelerated in a desirable manner in the slowdown region. For example, in a case where the slowdown region is a link on a narrow road or a link on a school zone, the necessity determination portion 14 may determine that the subject vehicle is decelerated in a desirable manner when a vehicle speed of the subject vehicle specified by the vehicle speed specifying portion 12 is reduced to or in the vicinity of a slow-driving speed. In a case where the slowdown region is a link immediately after the end of a tunnel or a link registered as a zone where careful driving is required, desirable travel speeds for the respective links may be stored in advance in the non-volatile memory of the HCU 1. The necessity determination portion 14 thus determines that the subject vehicle is decelerated in a desirable manner when the vehicle speed is reduced to the pre-stored desirable travel speed. Further, the necessity determination portion 14 may determine that the subject vehicle is decelerated in a desirable manner when a vehicle speed of the subject vehicle specified by the vehicle speed specifying portion 12 is reduced by a predetermined value or more in a predetermined time.

When the necessity determination portion 14 determines that the subject vehicle is decelerated in a desirable manner in the slowdown region (YES in S25), advancement is made to S26. On the other hand, when the necessity determination portion 14 determines that the subject vehicle is not decelerated in a desirable manner (NO in S25), the flow is returned to S22 to repeat the processing. S25 corresponds to a behavior determination portion of the present disclosure.

In S26, the display control portion 18 ends a display of the linear mark illusion image by directing the HUD 4 to end the display of the linear mark illusion image.

In S27, the necessity determination portion 14 determines whether the subject vehicle passed the slowdown region on the basis of a present location of the subject vehicle specified by the subject vehicle position specifying portion 11 and the road data stored in the map DB 7. When the necessity determination portion 14 determines that the subject vehicle passed the slowdown region (YES in S27), advancement is made to S28. On the other hand, when the necessity determination portion 14 determines that the subject vehicle has not passed the slowdown region (NO in S27), the necessity determination portion 14 repeats the processing in S27.

When the necessity determination portion 14 determines that the subject vehicle has not passed the slowdown region, the necessity determination portion 14 may determine whether the vehicle speed is over a desirable speed in the slowdown region to display the linear mark illusion image again in a case where the vehicle speed is over the desirable speed.

When a determination is made in S28 that it is timing to end the display control related processing (YES in S28), the display control related processing is ended as in S9. On the other hand, when it is not timing to end the display control related processing (NO in S28), the flow is returned to S21 to repeat the processing.

(Outline of First Modification)

In contrast to the first embodiment in which the linear mark illusion image is displayed under the condition that the subject vehicle exceeds a speed limit value, the first modification adopts the configuration to display the linear mark illusion image under the condition that the subject vehicle comes near a region where the subject vehicle should slow down. Even when the configuration as above is adopted, an effect of successfully leading the driver to decelerate the subject vehicle can be achieved. Hence, when the subject vehicle comes near a region where the subject vehicle should slow down, the driver is successfully led to decelerate the subject vehicle.

(Second Modification)

The first modification has described the configuration in which an excess speed above a speed limit value is not calculated and processing to address an excess speed above the speed limit value is not performed. However, the present disclosure is not limited to the configuration as above. For example, an excess speed above a speed limit value may be calculated and processing to address an excess speed above the speed limit value may be performed as in the first embodiment.

In such a case, a preferable speed in each slowdown region may be stored in advance in the non-volatile memory of the HCU 1 by correlating the preferable speeds and the respective slowdown regions so that an excess speed above a speed limit value can be calculated in each slowdown region. In the second modification, the speed limit value specifying portion 13 reads out the preferable speed of each slowdown region from the non-volatile memory of the HCU 1 and specifies the read preferable speed as the speed limit value. Also, the excess speed calculation portion 15 calculates an excess speed above the speed limit value in each slowdown region.

(Third Modification)

The above embodiment has described the configuration to display the linear mark illusion image in which the linear marks are aligned on the presumed lane boundary regions specified on the basis of the lane boundary regions detected by image recognition. However, the present disclosure is not limited to the configuration as above. For example, positions of the lane boundaries detected by image recognition may not be used. Instead, virtual presumed lane boundary regions found on the assumption that the subject vehicle is traveling on a center of a lane having a predetermined width may be stored in advance. In such a case, a linear mark illusion image in which the linear marks are aligned on the virtual presumed lane boundary regions is displayed by default. The linear mark illusion image may be generated and displayed in succession by successively bending a direction in which the linear marks are aligned according to a steering angle of the subject vehicle detected by a steering angle sensor (not shown).

A steering angle of the subject vehicle varies with a curvature of a curve ahead of the subject vehicle. Hence, by bending a direction in which the linear marks are aligned according to a steering angle of the subject vehicle detected by the steering angle sensor, the direction in which the linear marks are aligned can be bent according to the curvature of the curve ahead of the vehicle. Consequently, even when the subject vehicle is making a curve turn and a road surface ahead of the subject vehicle seems to bend according to the curvature of the curve, the linear mark illusion image can be displayed as if the linear marks were aligned along the actual road surface.

(Fourth Modification)

The embodiment above has described the configuration to display the linear marks. However, the present disclosure is not limited to the configuration as above. Marks of any other shape are available as long as the marks can be displayed as if a length in the vehicle width direction became shorter as the marks move in the travel direction of the subject vehicle and also as if the marks were aligned intermittently along a road surface in the travel direction.

Second Embodiment

It should be appreciated that the present disclosure is not limited to the above embodiment, and a second embodiment in the following is also included in the technical scope of the present disclosure. Hereinafter, the second embodiment will be described.

A drive assist system 200 of the second embodiment is different from the drive assist system 100 of the first embodiment in a configuration of an illusion image to be displayed. The drive assist system 200 of the second embodiment is also different from the drive assist system 100 of the first embodiment in that an illusion image is displayed when a subject vehicle comes near a point at which the subject vehicle should slow down or should stop before proceeding instead of displaying an illusion image when the subject vehicle exceeds a speed limit value. Except for the two differences specified above, the drive assist system 200 of the second embodiment is the same as the drive assist system 100 of the first embodiment.

(Schematic Configuration of Drive Assist System 200)

Figure 10:
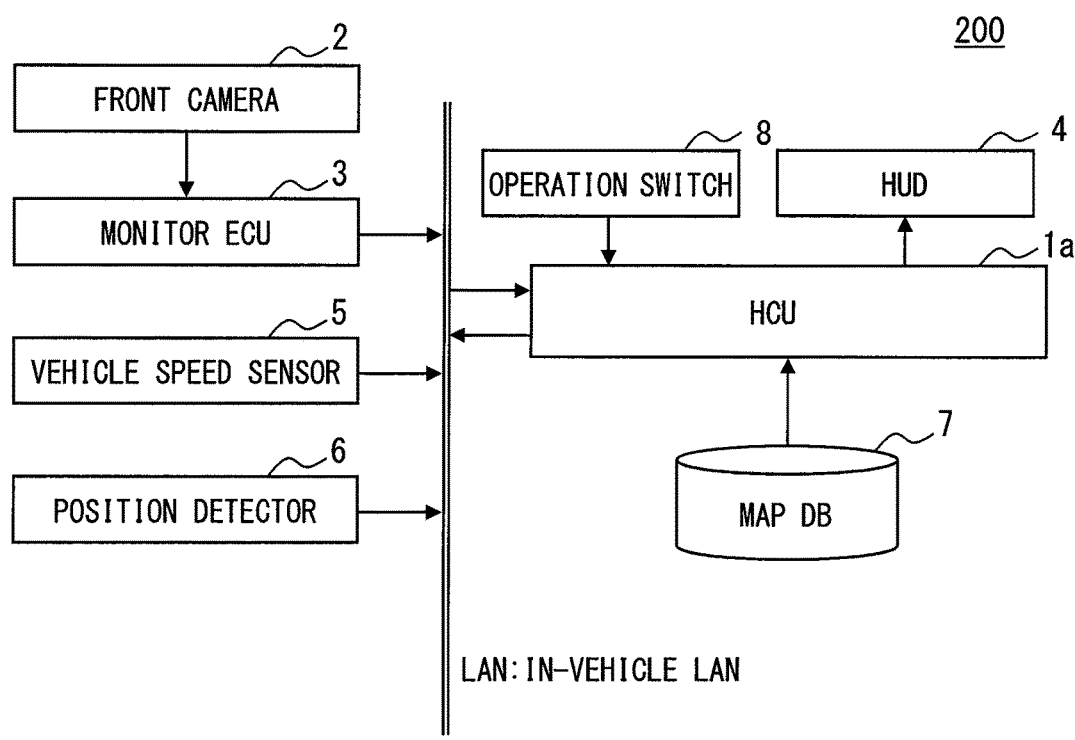
FIG. 10 is a block diagram showing a schematic configuration of a drive assist system.

FIG. 10 is a view showing an example of a schematic configuration of the drive assist system 200. As is shown in FIG. 10, the drive assist system 200 includes an HCU 1a, a front camera 2, a monitor ECU 3, a HUD 4, a vehicle speed sensor 5, a position detector 6, a map DB 7, and an operation switch group 8. The HCU 1a is the same as the HCU 1 of the first embodiment except for a part of the processing. The HCU 1a corresponds to a vehicle display control apparatus of the present disclosure.

(Detailed Configuration of HCU 1a)

Figure 11:
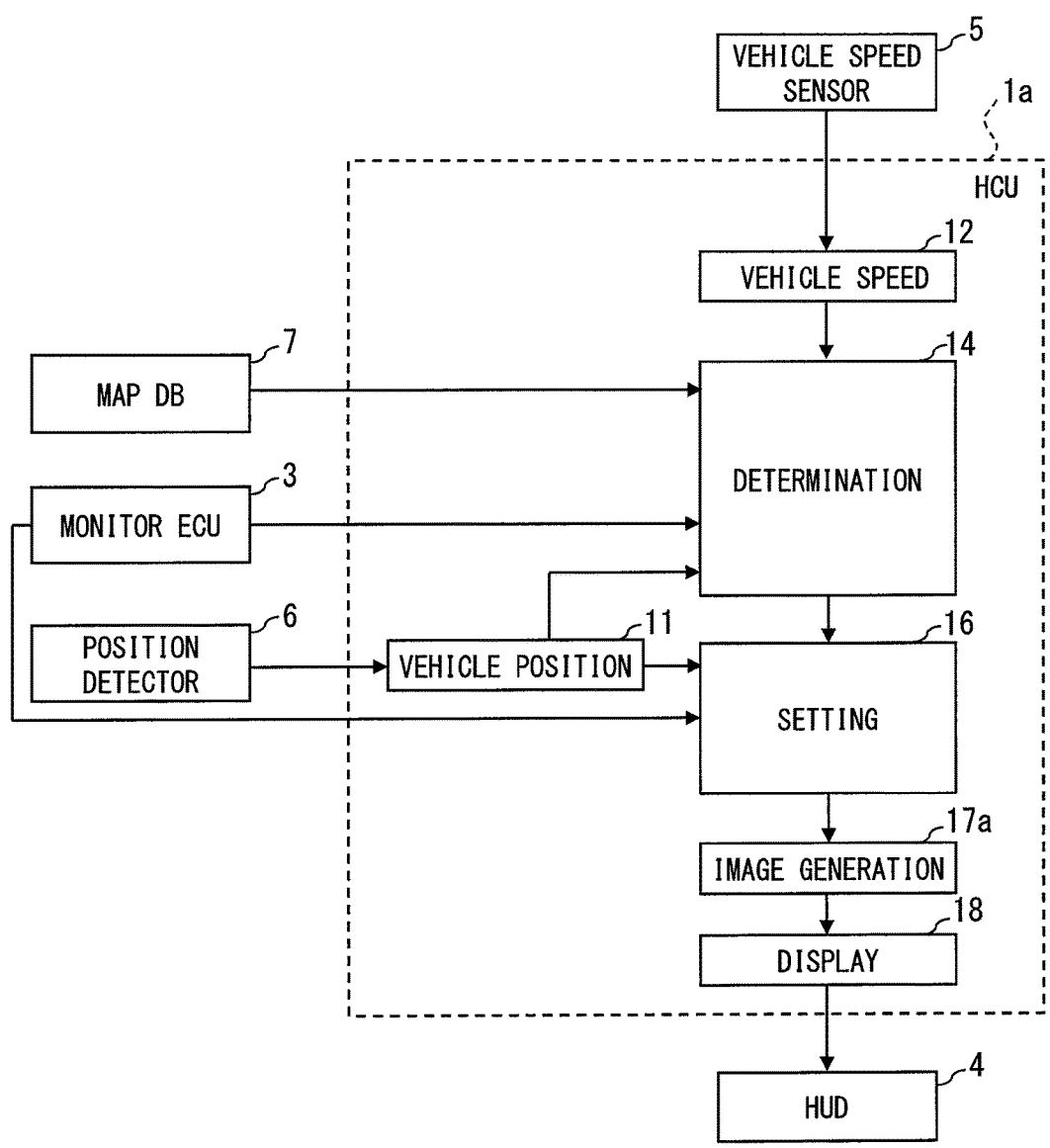
FIG. 11 is a block diagram showing a schematic configuration of an HCU of a second embodiment.

As is shown in FIG. 11, the HCU 1a includes a subject vehicle position specifying portion 11, a vehicle speed specifying portion 12, a necessity determination portion 14, a pre-generation setting portion 16, an image generation portion 17a, and a display control portion 18.

(Display Control Related Processing of Second Embodiment)

Figure 12:
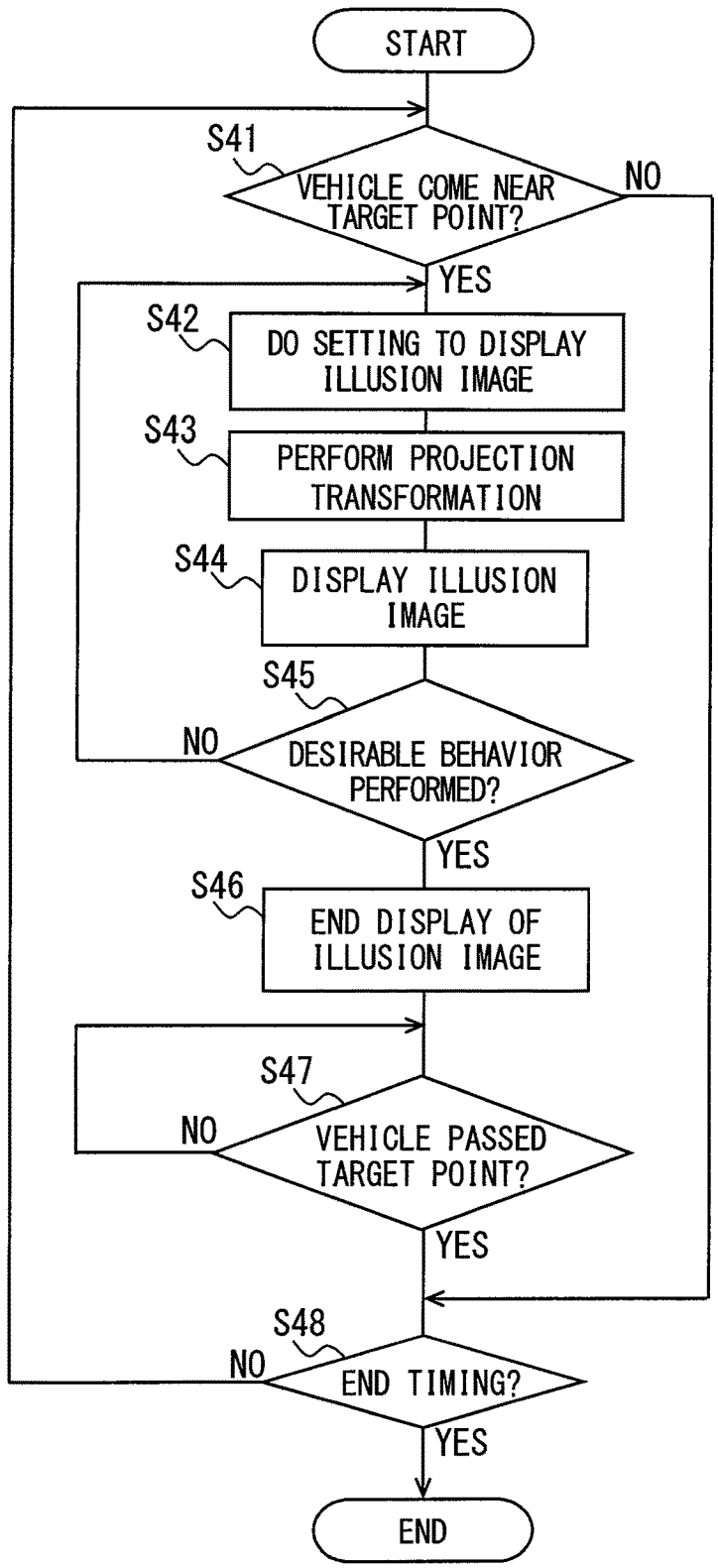
FIG. 12 is a flowchart depicting an example of a flow of display control related processing by the HCU of the second embodiment.

Display control related processing by the HCU 1a of the second embodiment will now be described using a flowchart of FIG. 12. The flowchart of FIG. 12 starts, for example, when an ignition power supply of the subject vehicle is turned ON.

Firstly in S41, the necessity determination portion 14 determines whether the subject vehicle comes near a point at which the subject vehicle should slow down or should stop before proceeding (hereinafter, the point is referred to as a target point). An example of a point at which the subject vehicle should slow down described herein is a pedestrian crossing at an intersection without a signal. An example of a point at which the subject vehicle should stop before proceeding is a stop position at a stop sign.

For example, when the monitor ECU 3 detects a stop line ahead in a lane the subject vehicle is travelling, the necessity determination portion 14 determines a center position of the stop line as a target point and determines that the subject vehicle comes near the target point. Also, when the monitor ECU 3 detects a pedestrian crossing ahead in a lane the subject vehicle is travelling under circumstances where a distance from the subject vehicle to a node without a signal becomes as short as or shorter than a preset distance, the necessity determination portion 14 determines a center position of the pedestrian crossing as a target point and determines that the subject vehicle comes near the target point. A distance from the subject vehicle to a node without a signal may be found on the basis of a present location of the subject vehicle specified by the subject vehicle position specifying portion 11 and node data stored in the map DB 7.

When the necessity determination portion 14 determines that the subject vehicle comes near the target point (YES in S41), advancement is made to S42. On the other hand, when the necessity determination portion 14 determines that the subject vehicle does not come near the target point (NO in S41), advancement is made to S48. S41 corresponds to a condition determination portion of the present disclosure.

In S42, the pre-generation setting portion 16 makes settings to display an on-road three-dimensional object illusion image described below that produces an optical illusion appearing that a three-dimensional object blocking a passage of the target point exists on an actual road surface. In the present embodiment, the settings are made as follows by way of example.

Firstly, the pre-generation setting portion 16 constitutes a world coordinate system in which a subject vehicle position is given as an origin, a front-rear direction when viewed from the subject vehicle as a Y axis, a right-left direction as an X axis, and a height direction as a Z axis. The subject vehicle location is, for example, a center of a front-rear axis and a right-left axis of the subject vehicle on a road surface on the assumption that the subject vehicle is located on the road surface. Hence, a plane given by Z=0 is the road surface on which the subject vehicle is located.

Subsequently, the pre-generation setting portion 16 transforms coordinates of the target point detected by the monitor ECU 3 to a position on the world coordinate system. The transformed position corresponds to a relative position of the target point with respect to the subject vehicle location. Since the target point is located on the road surface, the pre-generation setting portion 16 transforms the coordinates to a position on the plane given by Z=0 in the world coordinate system. More specifically, the pre-generation setting portion 16 specifies a relative position of the target point, such as a direction with respect to the subject vehicle location and a distance to the subject vehicle location, using a known method from a position in a captured image on the basis of an installed position and an orientation of an optical axis of the front camera 2 with respect to the subject vehicle location, and transforms the specified relative position to a position on the plane given by Z=0 in the world coordinate system.

Subsequently, the pre-generation setting portion 16 sets a three-dimensional object (hereinafter, referred to as an on-road three-dimensional object) of a height having a positive value with a bottom in contact with the plane given by Z=0 at the position of the target point on the plane given by Z=0 in the world coordinate system. The on-road three-dimensional object may be shaped like a human or a wall or any other shape. The on-road three-dimensional object may be high enough to make it unavoidable for a driver to decelerate when an on-road three-dimensional object of the same height is actually on the road surface at the target point.

The on-road three-dimensional object may be set to a constant height. Even when a height of the on-road three-dimensional object is constant, after the on-road three-dimensional object is transformed to an image viewed from the driver of the subject vehicle by projection transformation described below, it appears that the on-road three-dimensional object in the transformed image becomes taller while a distance between the subject vehicle and the target point is becoming shorter. In addition, the on-road three-dimensional object can be of any color easy to visually identify for the driver. For example, the on-road three-dimensional object may be displayed in blue.

In S43, the image generation portion 17a transforms the on-road three-dimensional image set in S42 to an image viewed from the driver of the subject vehicle by known projection transformation. Hereinafter, an image transformed from an on-road three-dimensional object by projection transformation is referred to as the on-road three-dimensional object illusion image. A position of eyes of the driver used in projection transformation may be a preliminarily stored fixed position or a position detected by an occupant camera. The image generation portion 17a also performs processing to confer transparency to the on-road three-dimensional object illusion image by, for example, known alpha blending.

In S44, the display control portion 18 sends the on-road three-dimensional object illusion image as an outcome of the projection transformation by the image generation portion 17a in S43 to the HUD 4 and directs the HUD 4 to display the on-road three-dimensional object illusion image.

Figure 13:
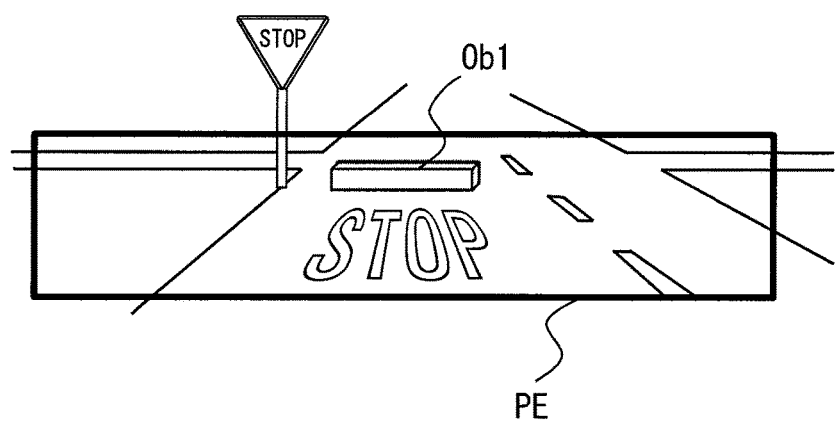
FIG. 13 is a schematic view showing a display example of an on-road three-dimensional object illusion image.

A description will now be given using FIG. 13 as to in which manner the on-road three-dimensional object illusion image is displayed when projected onto a windshield by the HUD 4 according to the processing in S44. FIG. 13 is a schematic view showing a view in front of the driver of the subject vehicle. In FIG. 13, Ob1 indicates the on-road three-dimensional object and PE indicates a projection surface on which the on-road three-dimensional object illusion image is projected.

As described above, the on-road three-dimensional object set in S42 is a three-dimensional object of a height having a positive value with the bottom in contact with the plane given by Z=0. Since the plane given by Z=0 corresponds to the road surface as described above, it appears to the driver that the on-road three-dimensional object illusion image transformed from the on-road three-dimensional object by projection transformation is actually present on the road surface as shown in FIG. 13. In addition, since the on-road three-dimensional object is set at a position of the target point, it appears to the driver that the on-road three-dimensional object illusion image blocks a passage of the target point as shown in FIG. 13.

The on-road three-dimensional object illusion image is merely an image. However, when superimposed and displayed on a road surface within a view in front of the driver of the subject vehicle, it appears that a three-dimensional object actually exists on the road surface. Hence, the on-road three-dimensional object illusion image can be said as an illusion image that produces an optical illusion.

In S45, the necessity determination portion 14 determines whether the driver behaved in a desirable manner for road traffic at the target point. In a case where the target point is a point at which the subject vehicle should stop before proceeding, the necessity determination portion 14 determines that the driver behaved in a desirable manner for road traffic at the target point when a vehicle speed of the subject vehicle specified by the vehicle speed specifying portion 12 is reduced to a lowest detectable speed by the vehicle speed sensor 5. In a case where the target point is a point at which the subject vehicle should slow down, the necessity determination portion 14 determines that the driver behaved in a desirable manner for road traffic when a vehicle speed of the subject vehicle specified by the vehicle speed specifying portion 12 is reduced to or in the vicinity of a slow-driving speed.

When the necessity determination portion 14 determines that the driver behaved in a desirable manner for road traffic at the target point (YES in S45), advancement is made to S46. On the other hand, when the necessity determination portion 14 determines that the driver did not behave in a desirable manner (NO in S45), the flow is returned to S42 to repeat the processing. S45 corresponds to a behavior determination portion of the present disclosure.

When the flow is returned to S42 and the processing is repeated, since the on-road three-dimensional object of a constant height is set at the position of the target point in S42, the on-road three-dimensional object is set at a position closer to the subject vehicle as a distance between the subject vehicle and the target point becomes shorter. Here, in the on-road three-dimensional object illusion image obtained by projection transformation, the on-road three-dimensional object set at a position closer to the subject vehicle appears taller. Hence, it appears to the driver that the on-road three-dimensional object becomes taller gradually while the subject vehicle is approaching the target point.

In S46, the display control portion 18 ends a display of the on-road three-dimensional object illusion image by directing the HUD 4 to end the display of the on-road three-dimensional object illusion image.

In S47, the necessity determination portion 14 determines whether the subject vehicle passed the target point. In a case where the target point is a point at which the subject vehicle should stop before proceeding, the necessity determination portion 14 may determine that the subject vehicle passed the target point when the monitor ECU 3 is no longer capable of detecting the stop line ahead in the lane the subject vehicle is traveling. In a case where the target point is a point at which the subject vehicle should slow down, the necessity determination portion 14 may determine that the subject vehicle passed the target point when the monitor ECU 3 is no longer capable of detecting the pedestrian crossing ahead in the lane the subject vehicle is travelling.

When the necessity determination portion 14 determines that the subject vehicle passed the target point (YES in S47), advancement is made to S48. On other hand, when the necessity determination portion 14 determines that the subject vehicle has not passed the target point (NO in S47), the necessity determination portion 14 repeats the processing in S47.

When a determination is made in S48 that it is timing to end the display control related processing (YES in S48), the display control related processing is ended as in S9 described above. On the other hand, when it is not timing to end the display control related processing (NO in S48), the flow is returned to S41 to repeat the processing.

(Outline of Second Embodiment)

According to the second embodiment, as has been described above, the on-road three-dimensional object illusion image makes it appear that a three-dimensional object blocking a passage of the target point actually exists on a road surface, and such an illusion image is displayed when the subject vehicle comes near the target point. Accordingly, the driver decelerates the subject vehicle instinctively in trying to avoid a collision with the three-dimensional object. Hence, in a case where the target point is a point at which the subject vehicle should slow down, by displaying the on-road three-dimensional object illusion image, the driver is successfully led to decelerate the subject vehicle. In a case where the target point is a stop position at a stop sign, by displaying the on-road three-dimensional object illusion image, the driver is successfully led to decelerate the subject vehicle and it becomes easy for the subject vehicle to stop at the stop position at an intersection as the driver continues to decelerate the subject vehicle. Hence, the driver is successfully led to stop the subject vehicle at the stop position at a stop sign.

Further, according to the second embodiment, when the subject vehicle is decelerated to a desirable speed before the subject vehicle reaches a point at which the subject vehicle should slow down or when the subject vehicle stops at a stop position at a stop sign, the on-road three-dimensional object illusion image is not displayed. Hence, the second embodiment can eliminate annoyance the driver may feel with the on-road three-dimensional object illusion image displayed even when the driver of the subject vehicle behaves in a desirable manner for road traffic.

A display of the on-road three-dimensional object illusion image is continued until the subject vehicle is decelerated to a desirable speed before the subject vehicle reaches a point at which the subject vehicle should slow down or until the subject vehicle stops at a stop position at a stop sign. Hence, the driver is urged to decelerate to a desirable speed before the subject vehicle reaches a point at which the subject vehicle should slow down or to stop at a stop position at a stop sign.

Further, according to the second embodiment, the on-road three-dimensional object illusion image is displayed in such a manner that it seems to the driver as if the three-dimensional object were becoming taller gradually while the subject vehicle is approaching the target point. For example, when painting is applied so as to make a three-dimensional object appear to pop out of the road surface, the painting appears in three dimensions only at one point. Hence, when the subject vehicle reaches such a point, the driver is startled by the three-dimensional object popped up out of nowhere and most probably brakes the subject vehicle suddenly. In contrast, according to the second embodiment, the on-road three-dimensional object illusion image is displayed in such a manner that it seems to the driver as if the three-dimensional object were becoming taller gradually while the subject vehicle is approaching the target point. Hence, the second embodiment can eliminate a problem that the driver startled by the three-dimensional object popped up out of nowhere brakes the subject vehicle suddenly.

(Fifth Modification)

Figure 14:
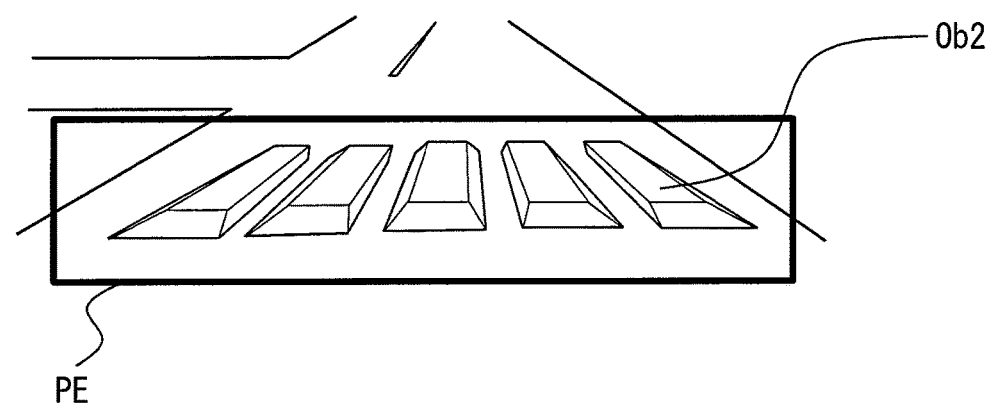
FIG. 14 is a schematic view showing another display example of the on-road three-dimensional object illusion image.

The on-road three-dimensional object set at the target point may be an on-road three-dimensional object of a shape such that makes a stop line or a pedestrian crossing appear to rise. In such a case, it appears that the stop line or the pedestrian crossing rises. An example when it appears that the pedestrian crossing rises will be described using FIG. 14. In FIG. 14, Ob2 indicates an on-road three-dimensional object illusion image which makes it appear that the pedestrian crossing rises, and PE indicates a projection surface on which the on-road three-dimensional object illusion image is projected.

(Sixth Modification)

The second embodiment has described the configuration to display the on-road three-dimensional object illusion image that produces an optical illusion as if a three-dimensional object blocking a passage of a point at which the subject vehicle should slow down were present on an actual road surface when the subject vehicle comes near the point. The present disclosure is not limited to the configuration as above. For example, it may be configured in such a manner so as to display an illusion image that produces an optical illusion as if a three-dimensional object narrowing a road ahead of the driver were present on an actual road surface when the subject vehicle comes near a slowdown region (hereinafter, the alternative configuration is referred to as the sixth modification). Hereinafter, the sixth modification will be described.

A drive assist system 200 of the sixth modification is the same as the drive assist system 200 of the second embodiment except for a part of the display control related processing by the HCU 1a.

(Display Control Related Processing of Sixth Modification)

Figure 15:
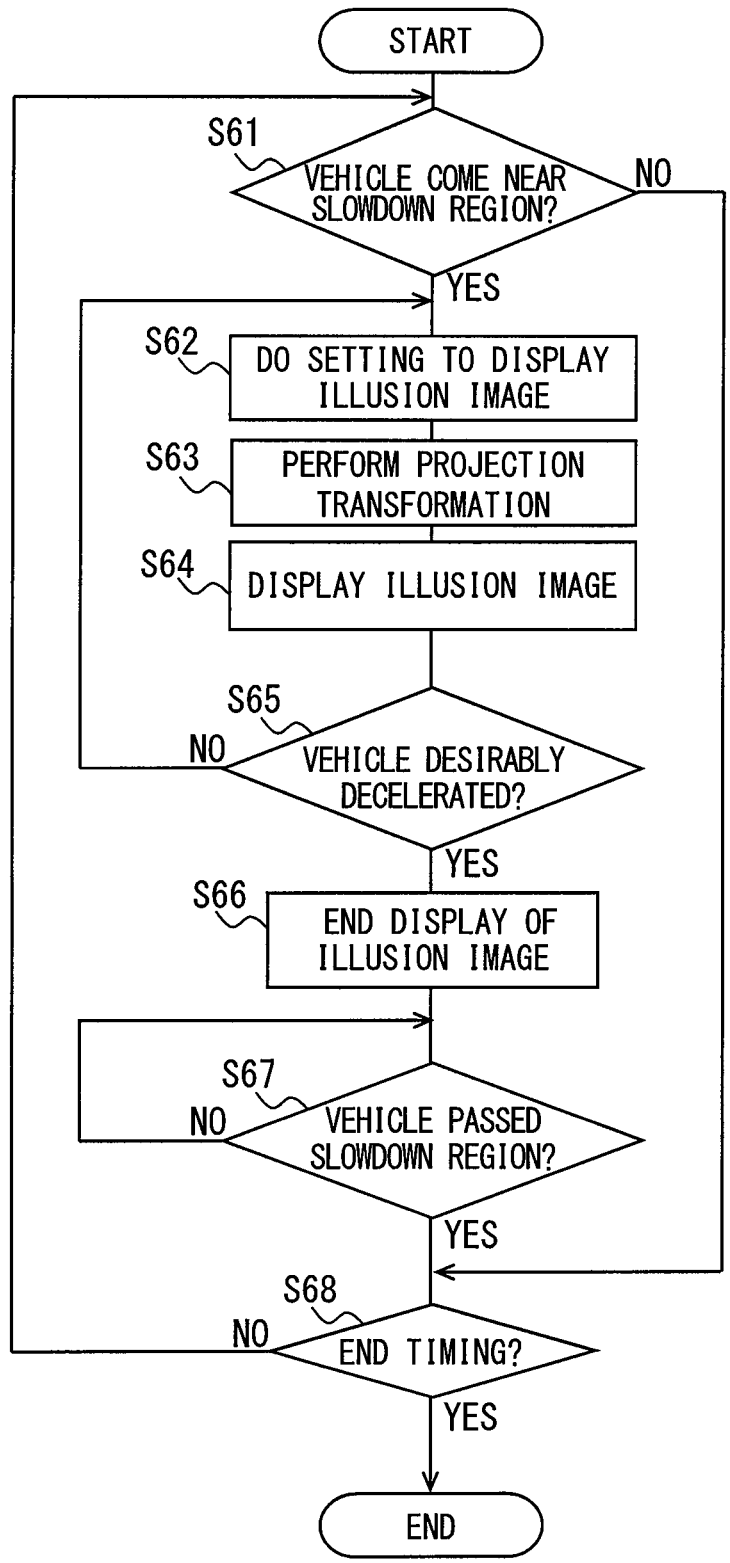
FIG. 15 is a flowchart depicting an example of a flow of display control related processing by an HCU of a sixth modification.

Display control related processing by the HCU 1a of the sixth modification will now be described using a flowchart of FIG. 15. The flowchart of FIG. 15 starts, for example, when the ignition power supply of the subject vehicle is turned ON.

Firstly in S61, the necessity determination portion 14 determines whether the subject vehicle comes near a slowdown region described in the first modification above. In the sixth modification, a pedestrian crossing at an intersection without a signal described in the second embodiment may be included in the slowdown region.

For example, when data of the slowdown region is included in the road data in the map DB 7, the necessity determination portion 14 determines whether the subject vehicle comes near the slowdown region on the basis of a present location of the subject vehicle specified by the subject vehicle position specifying portion 11 and the road data stored in the map DB 7. In a case where the slowdown region is a pedestrian crossing at an intersection without a signal, the necessity determination portion 14 determines whether the subject vehicle comes near the slowdown region in the same manner as described in the second embodiment.

When the necessity determination portion 14 determines that the subject vehicle comes near the slowdown region (YES in S61), advancement is made to S62. On the other hand, when the determination portion 14 determines that the subject vehicle does not come near the slowdown region (NO in S61), advancement is made to S68. S61 corresponds to a condition determination portion of the present disclosure.

In S62, the pre-generation setting portion 16 makes settings to display a three-dimensional guideline illusion image described below that produces an optical illusion as if a three-dimensional object narrowing a road ahead of the driver were present on an actual road surface. In the present embodiment, the settings are made as follows by way of example.

Firstly, the pre-generation setting portion 16 constitutes a world coordinate system in which a subject vehicle location is given as an origin, a front-rear direction when viewed from the subject vehicle as a Y axis, a right-left direction as an X axis, and a height direction as a Z axis. The subject vehicle location is, for example, a center of a front-rear axis and a right-left axis of the subject vehicle on a road surface on the assumption that the subject vehicle is located on the road surface. Subsequently, the pre-generation setting portion 16 transforms lane boundaries detected by the monitor ECU 3 as the lane boundaries of a lane the subject vehicle is travelling to positions on a plane given by Z=0 in the world coordinate system.

The pre-generation setting portion 16 sets two three-dimensional objects (hereinafter, referred to as the three-dimensional guidelines) of a height having a positive value and extending linearly ahead of the subject vehicle with bottoms in contact with the plane given by Z=0 at positions inside the lane boundaries on the plane given by Z=0 in the world coordinate system. Herein, an interval between the two three-dimensional guidelines in a vehicle width direction is set to be greater at least a width of the subject vehicle.

An interval between the three-dimensional guidelines in the vehicle width direction may be set to, for example, 3 meters in consideration of a heavy truck. Alternatively, the interval may be changed according to a size of vehicles, such as by changing the interval when the subject vehicle is a typical automobile and when the subject vehicle is a heavy truck. The three-dimensional guidelines may be low enough for the driver to avoid the three-dimensional guidelines while driving when the three-dimensional guidelines of the same height are actually present on a road surface at the target point.

The three-dimensional guidelines may be set to a constant height. Even when a height of the three-dimensional guidelines is constant, after the three-dimensional guidelines are transformed to an image viewed from the driver of the subject vehicle by projection transformation described below, it appears that the three-dimensional guidelines in the transformed image become taller while a distance between the subject vehicle and the target point becoming shorter. In addition, the three-dimensional guidelines can be of any color easy to visually identify for the driver.

When the monitor ECU 3 fails to detect the lane boundaries of a lane the subject vehicle is travelling, road boundaries divided by structures on roadsides or the like may be used instead of the lane boundaries.

In S63, the image generation portion 17a transforms the three-dimensional guidelines set in S62 to an image viewed from the driver of the subject vehicle by known projection transformation as in S43 described above. Hereinafter, an image transformed from the three-dimensional guidelines by projection transformation is referred to as a three-dimensional guideline illusion image. Also, the image generation portion 17a performs processing to confer transparency to the three-dimensional guideline illusion image by, for example, known alpha blending.

In S64, the display control portion 18 sends the three-dimensional guideline illusion image as an outcome of the projection transformation by the image generation portion 17a in S63 to the HUD 4 and directs the HUD 4 to display the three-dimensional guideline illusion image.

Figures 16, 17:
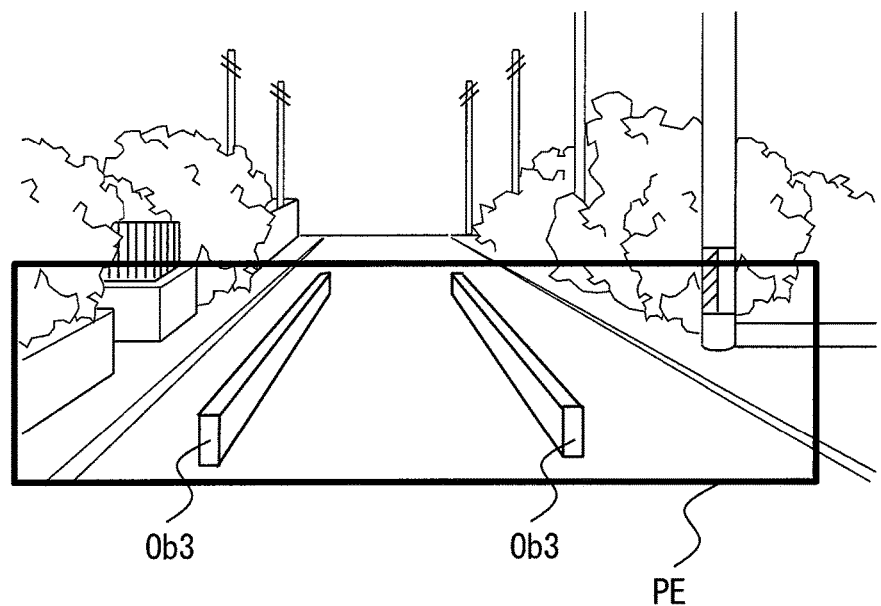
FIG. 16 is a schematic view showing a display example of a three-dimensional guideline illusion image.
FIG. 17 is a diagram showing a table to describe an example when an interval between three-dimensional guidelines is set narrower as an excess speed above a speed limit value becomes larger.

A description will now be given using FIG. 16 as to in which manner the three-dimensional guideline illusion image is displayed when projected onto the windshield by the HUD 4 according to the processing in S64. FIG. 16 is a schematic view showing a view in front of the driver of the subject vehicle. In FIG. 16, Ob3 indicates the three-dimensional guidelines and PE indicates a projection surface on which the three-dimensional guideline illusion image is projected.

As has been described above, the three-dimensional guidelines set in S62 are three-dimensional objects of a height having a positive value with the bottoms in contact with the plane given by Z=0. The plane given by Z=0 corresponds to a road surface as described above. Hence, as is shown in FIG. 16, it seems to the driver as if the three-dimensional guideline illusion image transformed from the three-dimensional guidelines by projection transformation were actually present on the road surface. In addition, the three-dimensional guidelines are set to extend linearly ahead of the subject vehicle at positions inside the lane boundaries. Hence, it seems to the driver as if a road ahead of the subject vehicle were narrowed by the three-dimensional guideline illusion image as shown in FIG. 16.

The three-dimensional guideline illusion image is merely an image. However, when superimposed and displayed on a road surface within a view in front of the driver of the subject vehicle, it appears that three-dimensional objects actually exist on the road surface. Hence, the three-dimensional guideline illusion image can be said as an illusion image that produces an optical illusion.

In S65, the necessity determination portion 14 determines whether the subject vehicle is decelerated in a desirable manner in the slowdown region as in S25 described above. When the necessity determination portion 14 determines that the subject vehicle is decelerated in a desirable manner in the slowdown region (YES in S65), advancement is made to S66. On the other hand, when the necessity determination portion 14 determines that the subject vehicle is not decelerated in a desirable manner (NO in S65), the flow is returned to S62 to repeat the processing. S65 corresponds to a behavior determination portion of the present disclosure.

In S66, the display control portion 18 ends a display of the three-dimensional guideline illusion image by directing the HUD 4 to end the display of the three-dimensional guideline illusion image.

In S67, the necessity determination portion 14 determines whether the subject vehicle passed the slowdown region. When the necessity determination portion 14 determines that the subject vehicle passed the slowdown region (YES in S67), advancement is made to S68. On the other hand, when the necessity determination portion 14 determines that the subject vehicle has not passed the slowdown region (NO in S67), the necessity determination portion 14 repeats the processing in S67. When the necessity determination portion 14 determines that the subject vehicle has not passed the slowdown region, the necessity determination portion 14 may determine whether the subject vehicle exceeds a desirable speed in the slowdown region to display the three-dimensional guideline illusion image again in a case where the subject vehicle exceeds the desirable speed.

When a determination is made in S68 that it is timing to end the display control related processing (YES in S68), the display control related processing is ended as in S9 described above. On the other hand, when it is not timing to end the display control related processing (NO in S68), the flow is returned to S61 to repeat the processing.

(Outline of Sixth Modification)

According to the sixth modification, the three-dimensional guideline illusion image produces an optical illusion as if three-dimensional objects narrowing a road ahead of the driver were present on an actual road surface, and such an illusion image is displayed when the subject vehicle comes near a slowdown region. Hence, the driver decelerates the subject vehicle instinctively in trying to go through without running off the road narrowed by the three-dimensional objects. Hence, by displaying the three-dimensional guideline illusion image when the subject vehicle comes near a slowdown region, the driver is successfully led to decelerate the subject vehicle.

Further, according to the sixth modification, the three-dimensional guideline illusion image is not displayed when the subject vehicle is decelerated to a desirable speed in a slowdown region. Hence, the sixth modification can eliminate annoyance the driver may feel with the three-dimensional guideline illusion image displayed even when the subject vehicle is decelerated to a desirable speed in the slowdown region.

Furthermore, according to the sixth modification, the three-dimensional guideline illusion image is displayed in such a manner that it seems to the driver as if the three-dimensional objects were becoming taller gradually while the subject vehicle is approaching the slowdown region. Hence, as has been described in Outline of Second Embodiment, the sixth modification can also eliminate a problem that the driver startled by the three-dimensional objects popped up out of nowhere brakes the subject vehicle suddenly.

(Seventh Modification)

Furthermore, it may be configured in such a manner so as to display the three-dimensional guideline illusion image which makes it appear that a road is narrowed more by the three-dimensional guidelines as a degree of slowdown required for the subject vehicle increases (hereinafter, the alternative configuration is referred to as the seventh modification).

In the seventh embodiment, a preferable speed for each slowdown region may be in advance stored in the non-volatile memory of the HCU 1a as a speed limit value correlated with the slowdown region so that an excess speed above the speed limit value can be calculated for each slowdown region. A speed limit value specifying portion 13 may be provided to the HCU 1*a* to specify the speed limit value by the speed limit value specifying portion 13. Also, an excess speed calculation portion 15 may be provided to the HCU 1*a* to calculate an excess speed above the speed limit value by the excess speed calculation portion 15.

In the seventh modification, the pre-generation setting portion 16 sets a narrower interval between the three-dimensional guidelines in the vehicle width direction as the excess speed calculation portion 15 calculates a larger excess speed above the speed limit value. For example, as is set forth in a table of FIG. 17, the pre-generation setting portion 16 sets an interval to 3 meters when an excess speed is less than 10 km/h, 2.5 meters when an excess speed is 10 km/h or more and less than 15 km/h, and 2 meters when an excess speed is 15 km/h or more.

As the road is narrowed more by the three-dimensional guidelines, the driver feels that the driver is not able to go through unless the driver decelerates the subject vehicle drastically. According to the seventh modification, the three-dimensional guidelines narrow a road more as a degree of slowdown required for the subject vehicle increases. Hence, the driver is successfully led to decelerate the subject vehicle more drastically as a degree of slowdown required for the subject vehicle increases.

(Eighth Modification)

The three-dimensional guidelines extending linearly ahead of the subject vehicle may be bent like a curve according to a steering angle of the subject vehicle detected by a steering angle sensor (not shown). When configured as above, while the subject vehicle is making a curve turn, the three-dimensional guidelines bent so as to conform to a shape of the curve can be displayed. Consequently, a display of the three-dimensional guidelines out of line with the road shape can be prevented and the driver does not feel strange.

(Ninth Modification)

The sixth modification above has described the configuration to display the three-dimensional guideline illusion image when the subject vehicle comes near a slowdown region. However, the present disclosure is not limited to the configuration as above. For example, as in the first embodiment, an illusion image may be displayed under the condition that a vehicle speed of the subject vehicle is over a speed limit value of a road the subject vehicle is travelling. In other words, it may be configured in such a manner that the three-dimensional guideline illusion image is displayed when a vehicle speed of the subject vehicle is over a speed limit value of the road the subject vehicle is travelling (hereinafter, the alternative configuration is referred to as the ninth modification). Hereinafter, the ninth modification will be described.

(Detailed Configuration of HCU 1*a* of Ninth Modification)

Figure 18:
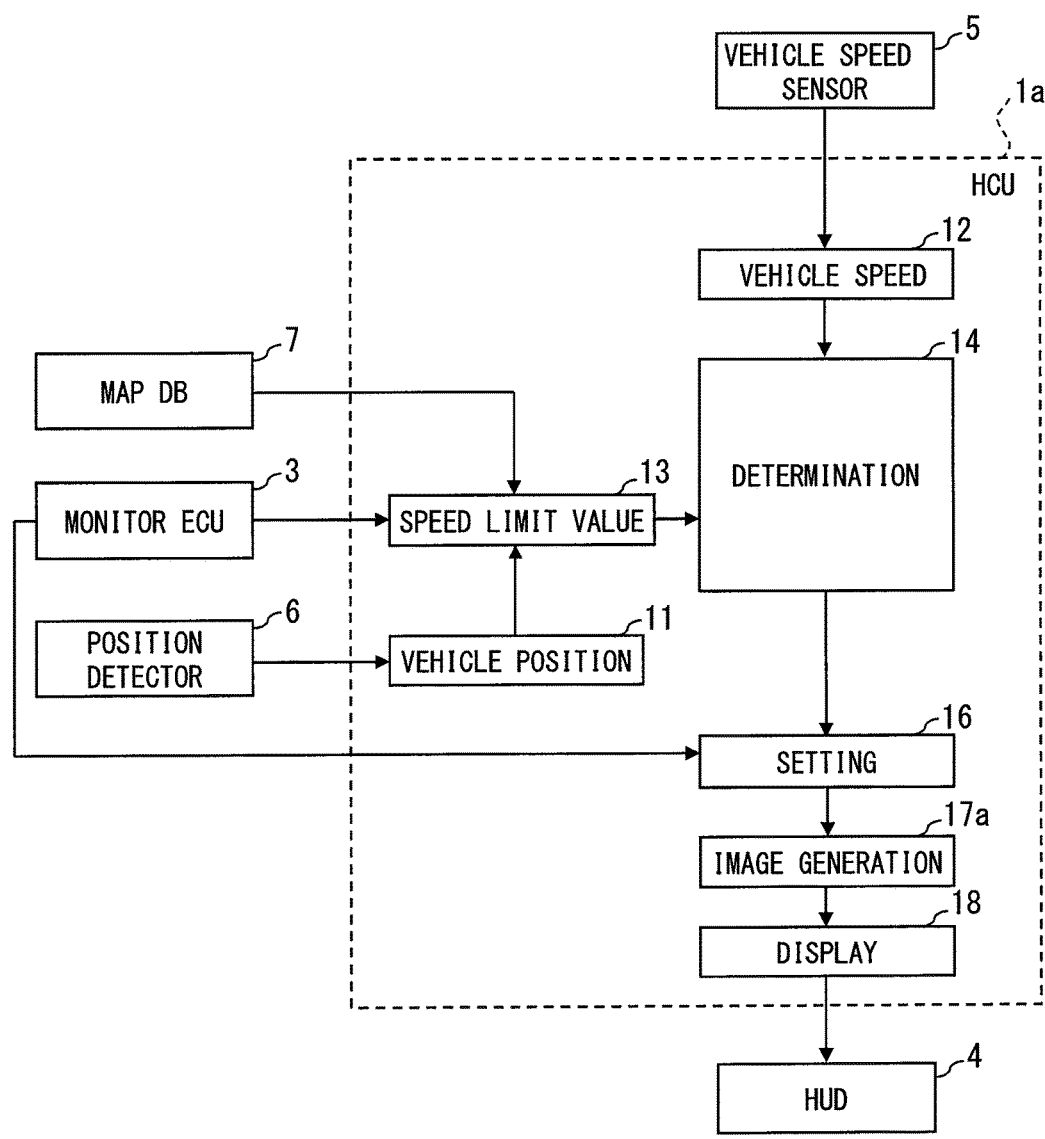
FIG. 18 is a block diagram depicting an example of a flow of display control related processing by an HCU of a ninth modification.

As is shown in FIG. 18, an HCU 1*a* of the ninth modification includes a subject vehicle position specifying portion 11, a vehicle speed specifying portion 12, a speed limit value specifying portion 13, a necessity determination portion 14, a pre-generation setting portion 16, an image generation portion 17*a*, and a control portion 18.

(Display Control Related Processing of Ninth Modification)

Figure 19:
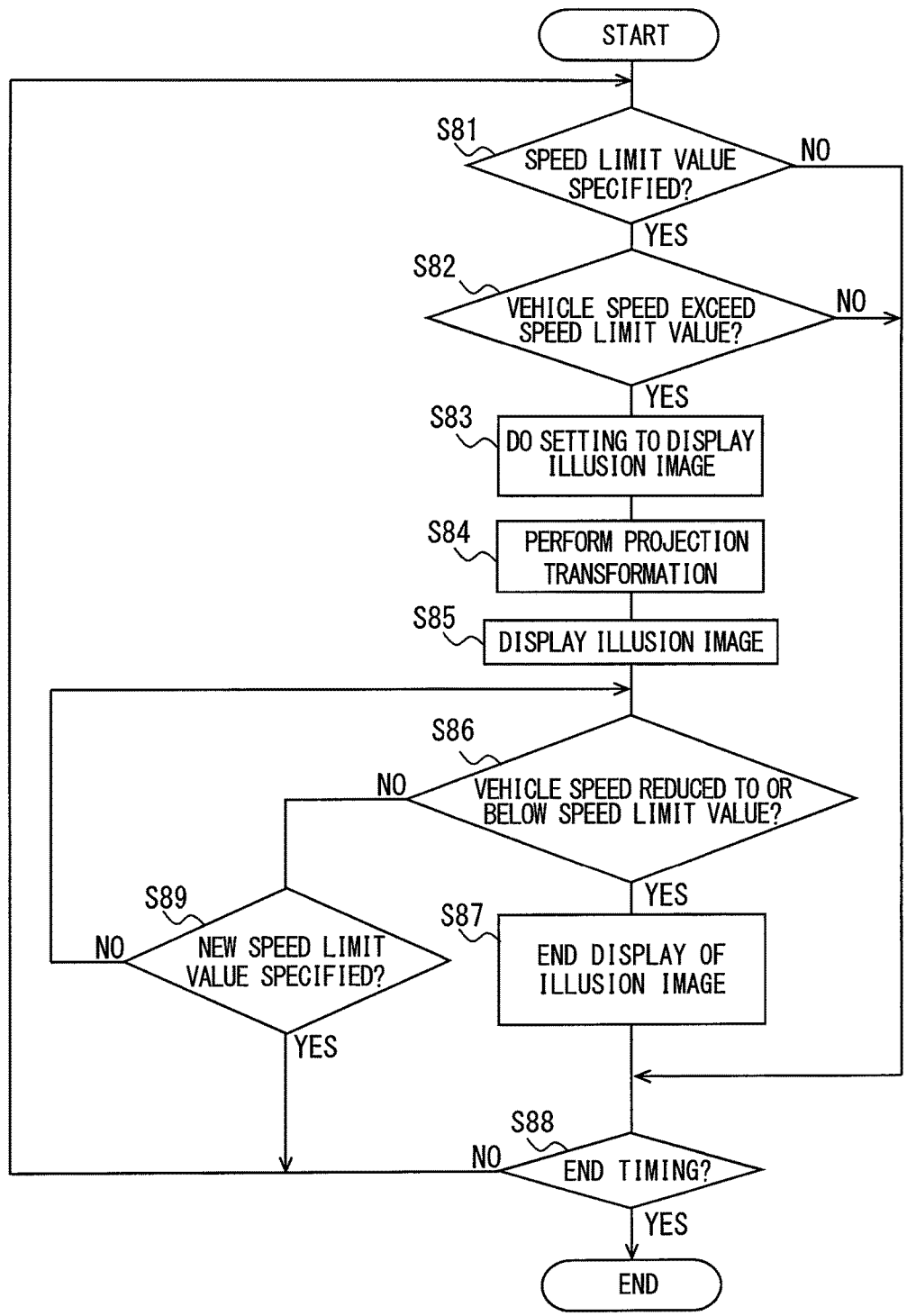
FIG. 19 is a flowchart depicting an example of a flow of display control related processing by the HCU of the ninth modification.

Display control related processing by the HCU 1*a* of the ninth modification will now be described using a flowchart of FIG. 19. The flowchart of FIG. 19 starts, for example, when the ignition power supply of the subject vehicle is turned ON.

Processing in S81 and S82 is the same as the processing in S1 and S2 of the first embodiment. Hence, S82 corresponds to a condition determination portion of the present disclosure. Processing in S83 through S85 is same as the processing in S62 through S64 of the sixth modification above.

In S86, the necessity determination portion 14 determines whether a vehicle speed of the subject vehicle specified by the vehicle speed specifying portion 12 is reduced to or below the speed limit value specified in S81. When the necessity determination portion 14 determines that the vehicle speed is not reduced to or below the speed limit value (YES in S86), advancement is made to S87. On the other hand, when the necessity determination portion 14 determines that the vehicle speed is not reduced to or below the speed limit value (NO in S86), advancement is made to S89. S86 corresponds to a behavior determination portion of the present disclosure.

In S87, the display control portion 18 ends a display of the three-dimensional guideline illusion image by directing the HUD 4 to end the display of the three-dimensional guideline illusion image.

When a determination is made in S88 that it is timing to end the display control related processing (YES in S88), the display control related processing is ended as in S9 described above. On the other hand, when it is not timing to end the display control related processing (NO in S88), the flow is returned to S81 to repeat the processing.

In S89 to which advancement is made when the necessity determination portion 14 determines in S86 that the vehicle speed is not reduced to or below the speed limit value, when the speed limit value specifying portion 13 specifies a new speed limit value (YES in S89), the flow is returned to S81 to repeat the processing as in S10 described above. On the other hand, when the speed limit value specifying portion 13 specifies a speed control value same as the speed limit value specified before or fails to specify a speed limit value itself (NO in S89), the speed limit value specifying portion 13 maintains the speed limit value specified before and the flow is returned to S86 to repeat the processing.

(Outline of Ninth Modification)

The ninth modification adopts the configuration to display the three-dimensional guideline illusion image under the condition that when the subject vehicle exceeds a speed limit value instead of the condition in the sixth modification above that when the subject vehicle comes near a region where the subject vehicle should slow down. Even when the configuration as above is adopted, an effect of successfully leading the driver to decelerate the subject vehicle can be achieved, too. Hence, when the subject vehicle exceeds a speed limit value, the driver is successfully led to decelerate the subject vehicle.

(Tenth Modification)

In the case where the configuration of the ninth embodiment is adopted, it may be configured such that, as in the seventh modification, the three-dimensional guideline illusion image is displayed as if a road were narrowed more by the three-dimensional guidelines as a degree of slowdown required for the subject vehicle increases (hereinafter, the configuration is referred to as the tenth modification). An excess speed calculation portion 15 may be provided to the HCU 1*a* to calculate an excess speed above the speed limit value using the excess speed calculation portion 15.

In the tenth modification, as in the seventh modification above, a road is narrowed more by the three-dimensional guidelines as a degree of slowdown required for the subject vehicle increases. Hence, the driver is successfully led to decelerate the subject vehicle more drastically as a degree of slowdown required for the subject vehicle increases.

(Eleventh Modification)

The sixth and ninth modifications have described the configuration to display an illusion image that produces an optical illusion as if two three-dimensional guidelines extending linearly ahead of the subject vehicle were present as three-dimensional objects narrowing a road ahead of the driver. However, the present disclosure is not limited to the configuration as above. The illusion image can be any other illusion image that produces an optical illusion as if a three-dimensional object narrowing a road ahead of the driver were present.

Figure 20:
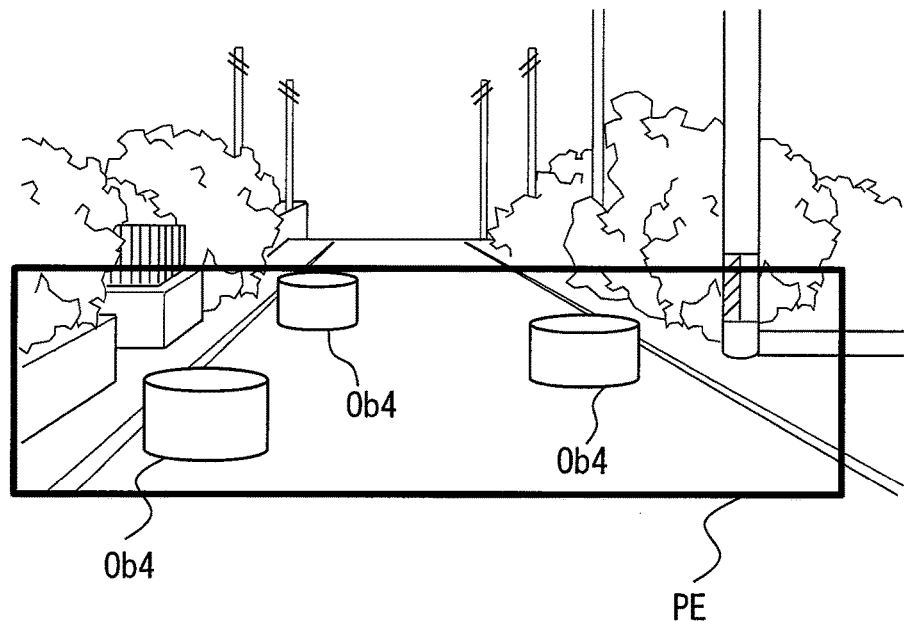
FIG. 20 is a schematic view showing another display example of the three-dimensional guideline illusion image.

For example, the illusion image may produce an optical illusion as if one of the two three-dimensional guidelines extending linearly ahead of the subject vehicle, either on the right or left side of the driver, were present. Also, as is shown in FIG. 20, the illusion image may produce an optical illusion as if three-dimensional objects were present on a road surface ahead of the subject vehicle on either side in a zigzag manner. FIG. 20 is a schematic view showing a view in front of the driver of the subject vehicle. In FIG. 20, Ob4 indicate three-dimensional objects which seem as if the three-dimensional objects were present on the road surface ahead of the subject vehicle on either side in a zigzag manner, and PE indicates a projection surface on which the illusion image is projected.

Third Embodiment

It should be appreciated that the present disclosure is not limited to the embodiments described above and a third embodiment in the following is also included in the technical scope of the present disclosure. Hereinafter, the third embodiment will be described.

A drive assist system 300 of the third embodiment is different from the drive assist system 100 of the first embodiment in a manner in which an illusion image is displayed. Also, the drive assist system 300 of the third embodiment is different from the drive assist system 100 of the first embodiment in that an illusion image is displayed when a subject vehicle reaches a tunnel where the subject vehicle should slow down instead of displaying an illusion image when the subject vehicle exceeds a speed limit value. Except for the two differences specified above, the drive assist system 300 of the third embodiment is the same as the drive assist system 100 of the first embodiment.

(Schematic Configuration of Drive Assist System 300)

Figure 21:
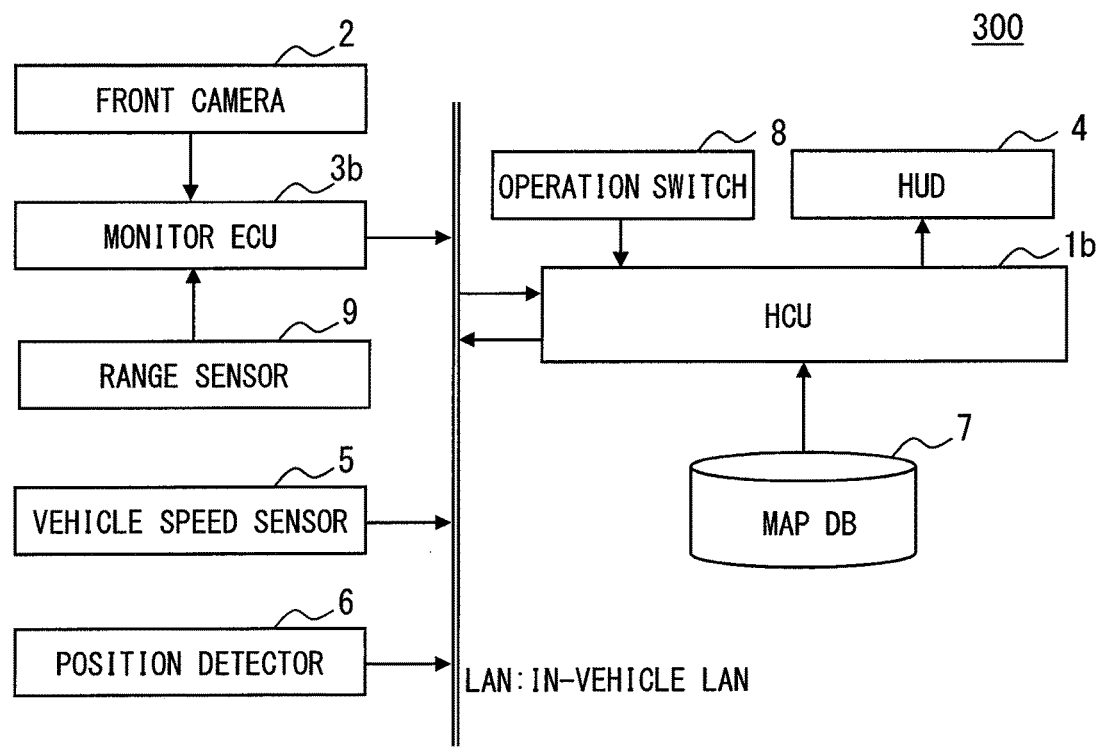
FIG. 21 is a block diagram showing a schematic configuration of a drive assist system.

FIG. 21 is a view showing an example of a schematic configuration of the drive assist system 300. As is shown in FIG. 21, the drive assist system 300 includes an HCU 1b, a front camera 2, a monitor ECU 3b, a HUD 4, a vehicle speed sensor 5, a position detector 6, a map DB 7, an operation switch group 8, and a range sensor 9.

The HCU 1b is same as the HCU 1 of the first embodiment except for a part of the processing. The range sensor 9 is a sensor installed to the subject vehicle so as to detect an obstacle existing on the periphery of the subject vehicle. Examples of the range sensor 9 include a millimeter-wave radar, a laser radar, and a sonar.

The monitor ECU 3b detects a relative position of an obstacle existing on the periphery of the subject vehicle on the basis of a signal from the range sensor 9. For example, in a case where the range sensor 9 is a millimeter-wave radar, a laser radar, or a sonar, the monitor ECU 3b detects a distance from the subject vehicle to the obstacle by detecting an azimuth direction of the obstacle with respect to the subject vehicle on the basis of a reflected wave of a probing wave by finding in which direction the probing wave was transmitted, and measuring a time since the probing wave was transmitted until the reflected wave was received. In a case where a stereo camera is used as the range sensor 9, a distance from the subject vehicle to the obstacle may be detected on the basis of a parallax amount between a pair of cameras. Hereinafter, the present embodiment will describe a case where the range sensor 9 is used.

In the present embodiment, assume that the monitor ECU 3b detects a relative position of a tunnel wall surface with respect to the subject vehicle while the subject vehicle is in a tunnel on the basis of a signal from the range sensor 9. More specifically, the monitor ECU 3b detects a relative position of each reflection point on the tunnel wall surface with respect to the subject vehicle.

(Detailed Configuration of HCU 1b)

Figure 22:
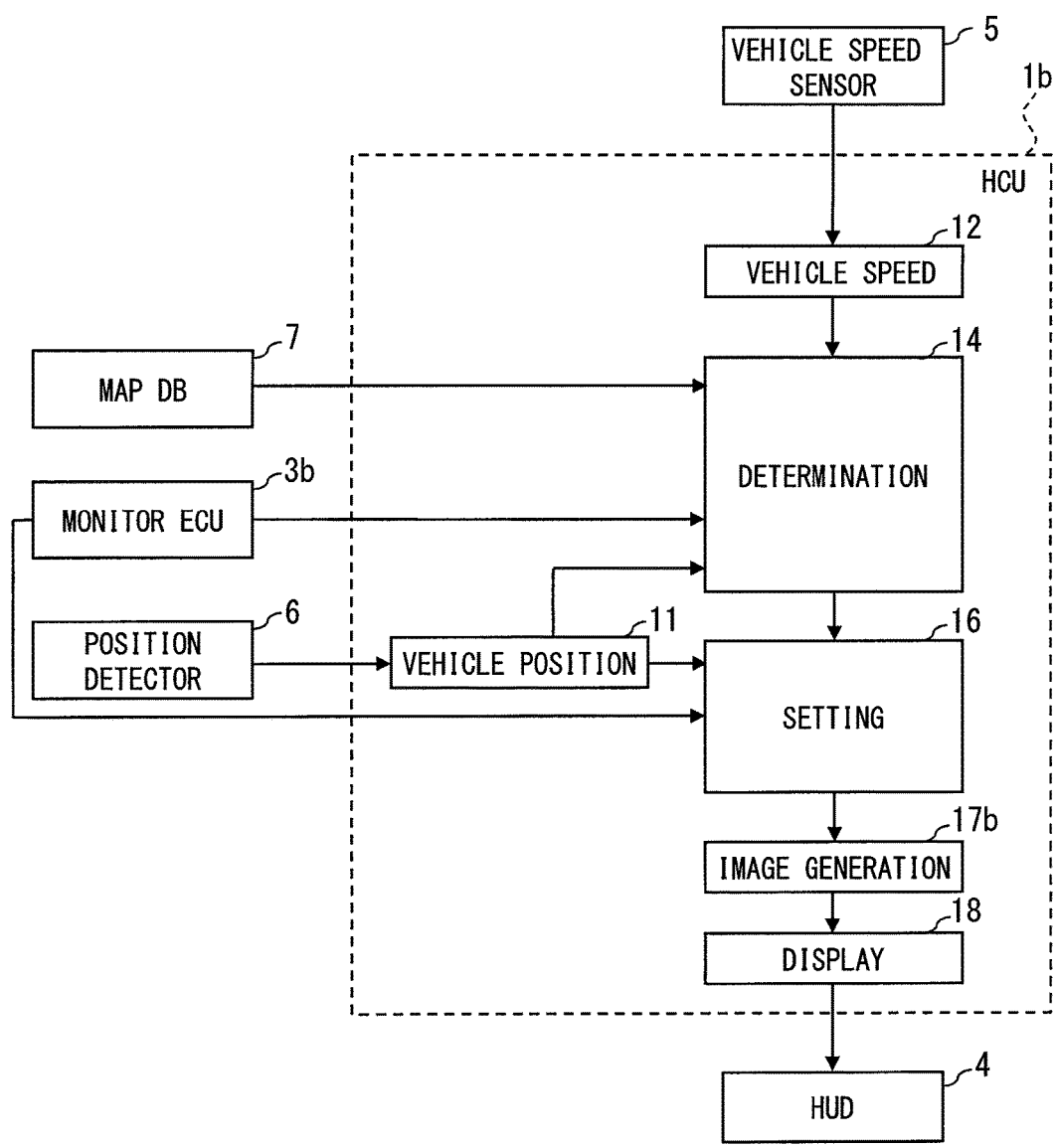
FIG. 22 is a block diagram showing a schematic configuration of an HCU of a third embodiment.

As is shown in FIG. 22, the HCU 1b includes a subject vehicle position specifying portion 11, a vehicle speed specifying portion 12, a necessity determination portion 14, a pre-generation setting portion 16, an image generation portion 17b, and a display control portion 18.

(Display Control Related Processing of Third Embodiment)

Figure 23:
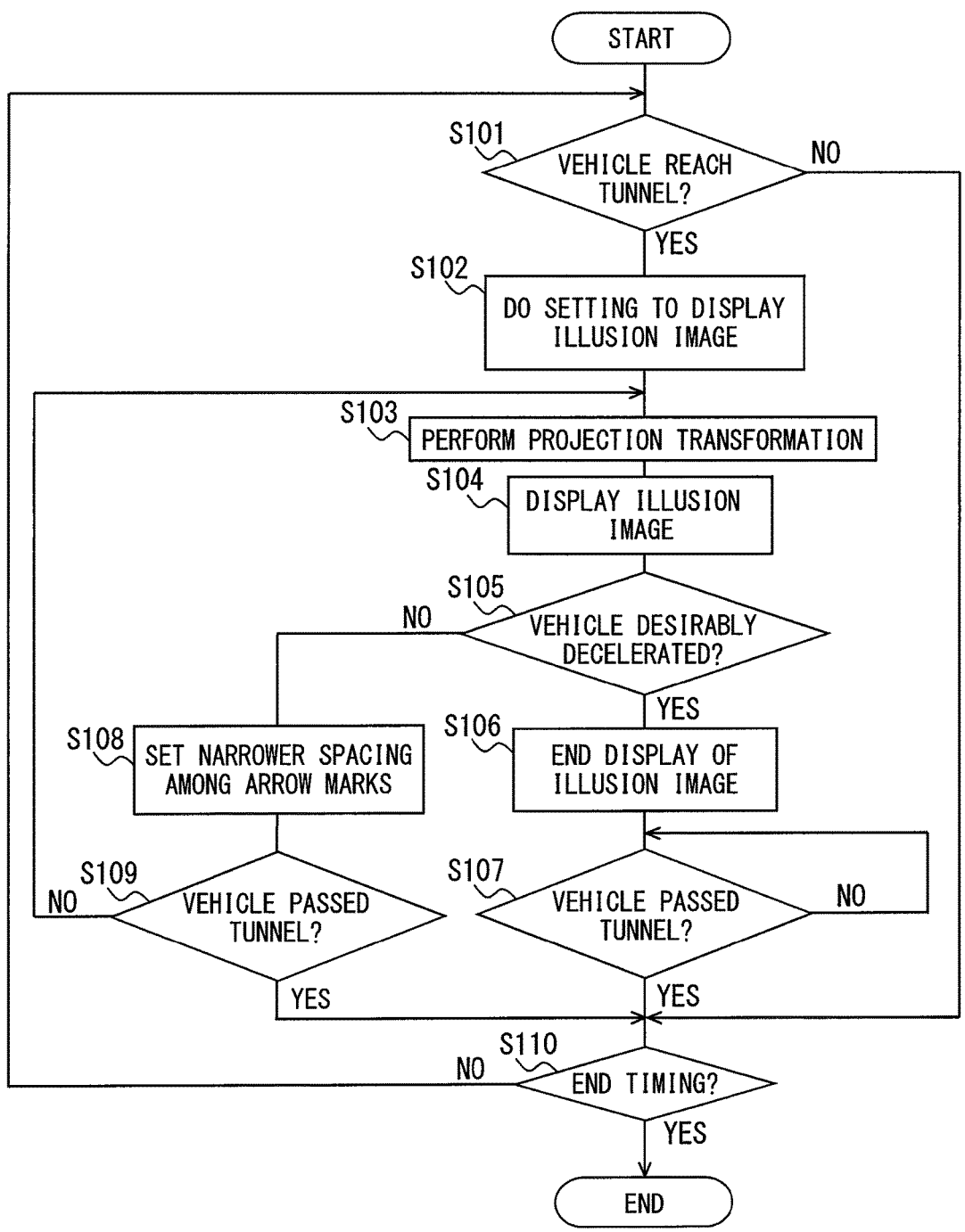
FIG. 23 is a flowchart depicting an example of a flow of display control related processing by the HCU of the third embodiment.

Display control related processing by the HCU 1b of the third embodiment will now be described using a flowchart of FIG. 23. The flowchart of FIG. 23 starts, for example, when an ignition power supply of the subject vehicle is turned ON.

Firstly in S101, the necessity determination portion 14 determines whether the subject vehicle reaches a tunnel where the subject vehicle should slow down. A tunnel where the subject vehicle should slow down means a tunnel that has a long moderate downhill and therefore has a tendency that a vehicle speed increases more than necessary.

The third embodiment will be described on the assumption that the map DB 7 includes link data on the basis of which a tunnel where the subject vehicle should slow down can be identified. The necessity determination portion 14 determines whether the subject vehicle reaches a tunnel where the subject vehicle should slow down on the basis of the link data included in the map DB 7 and a present location of the subject vehicle specified by the subject vehicle position specifying portion 11.

When the necessity determination portion 14 determines that the subject vehicle reaches a tunnel where the subject vehicle should slow down (YES in S101), advancement is made to S102. On the other hand, when the necessity determination portion 14 determines that the subject vehicle has not reached the tunnel (NO in S101), advancement is made to S110. S101 corresponds to a condition determination portion of the present disclosure.

In S102, the pre-generation setting portion 16 makes settings to display an arrow mark illusion image which makes it appear that arrow-shaped marks (hereinafter, referred to as arrow marks) aligned intermittently in a travel direction are painted on the tunnel wall surface. In the present embodiment, the settings are made as follows by way of example.

Firstly, the pre-generation setting portion 16 constitutes a world coordinate system in which a subject vehicle location is given as an origin, a front-rear direction when viewed from the subject vehicle as a Y axis, a right-left direction as an X axis, and a height direction as a Z axis. The subject vehicle location is, for example, a center of a front-rear axis and a right-left axis of the subject vehicle on a road surface on the assumption that the subject vehicle is located on the road surface.

Subsequently, the pre-generation setting portion 16 transforms coordinates of relative positions of the respective reflection points on the tunnel wall surface detected by the monitor ECU 3b (hereinafter, the reflection points are referred to as the wall surface reflection points) to positions on the world coordinate system. The pre-generation setting portion 16 specifies a region of the tunnel wall surface in the world coordinate system by linking positions of the wall surface reflection points transformed to the positions on the world coordinate system.

After the pre-generation setting portion 16 specifies the region of the tunnel wall surface in the world coordinate system, the pre-generation setting portion 16 sets the arrow marks aligned intermittently in a travel direction of the subject vehicle along the specified region of the wall surface. The arrow marks can be of any color easy to visually identify for the driver. For example, the arrow marks may be displayed in white or blue.

In S103, the image generation portion 17b transforms the arrow marks set in S102 to an image viewed from the driver of the subject vehicle by known projection transformation as in S43 described above. Hereinafter, an image transformed from the arrow marks by projection transformation is referred to as the arrow mark illusion image.

In S104, the display control portion 18 sends the arrow mark illusion image as an outcome of the projection transformation by the image generation portion 17b in S103 to the HUD 4 and directs the HUD 4 to display the arrow mark illusion image.

Figure 24:
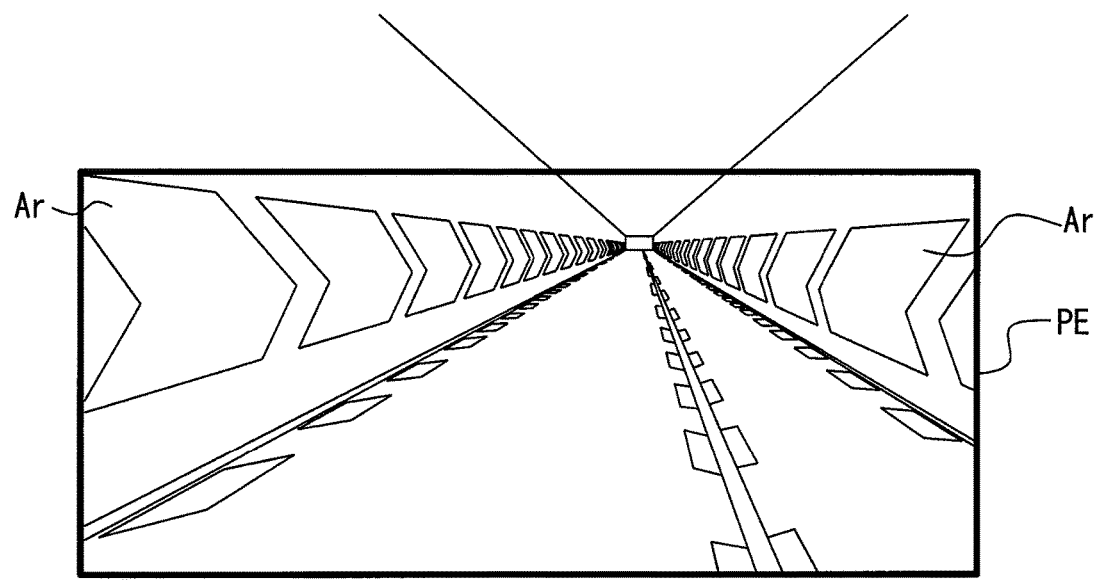
FIG. 24 is a schematic view showing a display example of an arrow mark illusion image.

A description will now be given using FIG. 24 as to in which manner the arrow mark illusion image is displayed when projected onto a windshield by the HUD 4 according to the processing in S104. FIG. 24 is a schematic view showing a view in front of the driver of the subject vehicle. In FIG. 24, Ar indicates the arrow marks and PE indicates a projection surface on which the arrow mark illusion image is projected.

As has been described, the arrow marks set in S102 are arrow marks aligned along the region of the tunnel wall surface on the world coordinate system. Hence, it appears to the driver that the arrow mark illusion image transformed from the arrow marks by projection transformation is actually painted on the tunnel wall surface as shown in FIG. 24.

In S105, the necessity determination portion 14 determines whether the subject vehicle is decelerated in a desirable manner in the tunnel where the subject vehicle should slow down. For example, a desirable travel speed in a tunnel where the subject vehicle should slow down may be in advance stored in a non-volatile memory of the HCU 1b. The necessity determination portion 14 thus determines that the subject vehicle is decelerated in a desirable manner when a vehicle speed is reduced to the pre-stored desirable travel speed. Alternatively, in a case where a speed limit value of a tunnel where the subject vehicle should slow down is in advance stored in the map DB 7, the necessity determination portion 14 may determine that the subject vehicle is decelerated in a desirable manner when a vehicle speed of the subject vehicle is reduced to or below the pre-stored speed limit value.

When the necessity determination portion 14 determines that the subject vehicle is decelerated in a desirable manner (YES in S105), advancement is made to S106. On the other hand, when the necessity determination portion 14 determines that the subject vehicle is not decelerated in a desirable manner (NO in S105), advancement is made to S108. S105 corresponds to a behavior determination portion of the present disclosure.

In S106, the display control portion 18 ends a display of the arrow mark illusion image by directing the HUD 4 to end the display of the arrow mark illusion image and advancement is made to S107.

In S107, the necessity determination portion 14 determines whether the subject vehicle passed the tunnel where the subject vehicle should slow down on the basis of link data included in the map DB 7 and a present location of the subject vehicle specified by the subject vehicle position specifying portion 11. When the necessity determination portion 14 determines that the subject vehicle passed the tunnel where the subject vehicle should slow down (YES in S107), advancement is made to S110. On the other hand, when the necessity determination portion 14 determines that the subject vehicle has not passed the tunnel (NO in S107), the necessity determination portion 14 repeats the processing in S107. When the necessity determination portion 14 determines that the subject vehicle has not passed the tunnel where the subject vehicle should slow down, the necessity determination portion 14 may determine whether the subject vehicle exceeds a desirable speed in the tunnel where the subject vehicle should slow down to display the arrow mark illusion image again in a case where the subject vehicle exceeds the desirable speed.

In S108 to which advancement is made when the necessity determination portion 14 determines in S105 that the subject vehicle is not decelerated in a desirable manner, the pre-generation setting portion 16 sets a spacing narrower than the spacing set before among the arrow marks aligned intermittently in the travel direction of the subject vehicle.

In S109, the necessity determination portion 14 determines whether the subject vehicle passed the tunnel where the subject vehicle should slow down as in S107. When the necessity determination portion 14 determines that the subject vehicle passed the tunnel where the subject vehicle should slow down (YES in S109), advancement is made to S110. On the other hand, when the necessity determination portion 14 determines that the subject vehicle has not passed the tunnel (NO in S109), the flow is returned to S103 to repeat the processing.

By returning the flow to S103 and repeating the processing, the arrow mark illusion image showing the arrow marks spaced narrower than in the arrow mark illusion image before is displayed. Hence, when the subject vehicle is not decelerated in a desirable manner in the tunnel where the subject vehicle should slow down, the spacing among the arrow marks in the arrow mark illusion image is narrowed gradually while the subject vehicle is moving forward.

When a determination is made in S110 that it is timing to end the display control related processing (YES in S110), the display control related processing is ended as in S9 described above. On the other hand, when it is not timing to end the display control related processing (NO in S110), the flow is returned to S101 to repeat the processing.

(Outline of Third Embodiment)

When a spacing among the arrow marks aligned intermittently in the travel direction of the subject vehicle as if the arrow marks were painted on the tunnel wall surface is narrowed gradually while the subject vehicle is moving forward, the driver has an optical illusion appearing that a vehicle speed of the subject vehicle increases. Normally, the driver is more likely to decelerate the subject vehicle instinctively when the driver feels that the subject vehicle is moving faster.

In the third embodiment, the arrow marks aligned intermittently in the travel direction of the subject vehicle are displayed in such a manner that it appears to the driver that the arrow marks are actually painted on the tunnel wall surface and that a spacing among the arrow marks narrows gradually while the subject vehicle is moving forward. Hence, the driver has an optical illusion appearing that a vehicle speed of the subject vehicle were increasing and is therefore highly likely to decelerate the subject vehicle instinctively. In the third embodiment, by displaying the illusion image in the manner described as above when the subject vehicle reaches a tunnel where the subject vehicle should slow down, the driver is successfully led to decelerate the subject vehicle in a tunnel where the subject vehicle should slow down.

Also, according to the third embodiment, the arrow mark illusion image is not displayed when the subject vehicle is decelerated to a desirable speed in a tunnel where the subject vehicle should slow down. Hence, the third embodiment can eliminate annoyance the driver may feel with the arrow mark illusion image displayed even when the subject vehicle is decelerated to a desirable speed in a tunnel where the subject vehicle should slow down.

(Twelfth Modification)

The third embodiment has described the configuration to display the arrow mark illusion image when the subject vehicle reaches a tunnel where the subject vehicle should slow down. However, the present disclosure is not limited to the configuration as above. For example, it may be configured in such a manner that the arrow mark illusion image is displayed when the subject vehicle exceeds a speed limit value while travelling on a road along which walls, such as soundproof walls, are erected or while driving in a tunnel. A speed limit value specifying portion 13 may be provided to the HCU 1b to enable the necessity determination portion 14 to determine whether the subject vehicle exceeds a speed limit value in the same manner as in the first embodiment.

Fourth Embodiment

It should be appreciated that the present disclosure is not limited to the embodiments above and a fourth embodiment in the following is also included in the technical scope of the present disclosure. Hereinafter, the fourth embodiment will be described.

A drive assist system 300 of the fourth embodiment is the same as the drive assist system 300 of the third embodiment except that an arrow mark illusion image is displayed under the condition that a subject vehicle reaches a tunnel where the subject vehicle should speed up instead of a tunnel where the subject vehicle should slow down and that a spacing among the arrow marks is not gradually narrowed but gradually widened while the subject vehicle is moving forward.

(Display Control Related Processing of Fourth Embodiment)

Figure 25:
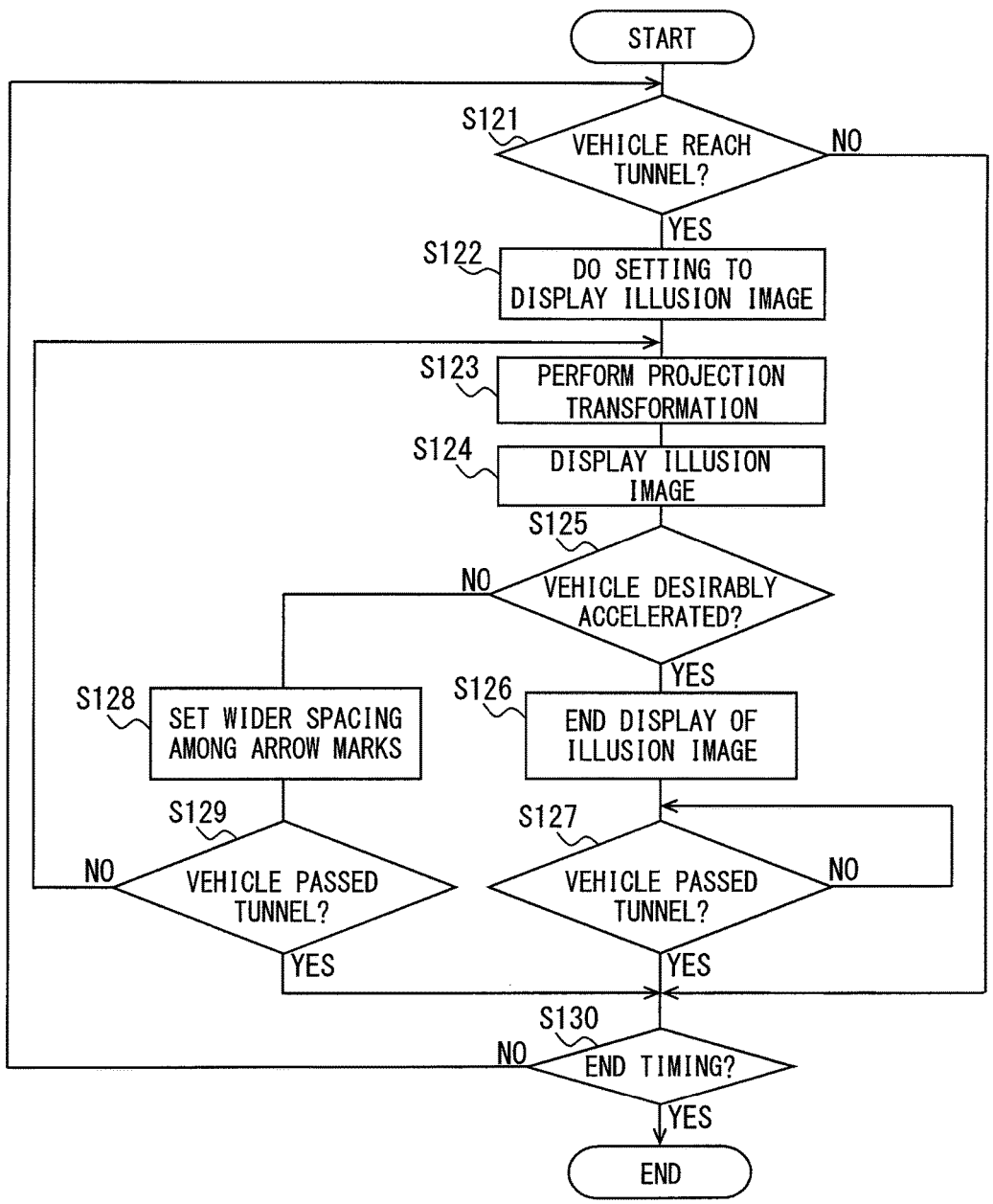
FIG. 25 is a flowchart depicting an example of a flow of display control related processing by an HCU of a fourth embodiment.

Display control related processing by an HCU 1b of the forth embodiment will now be described using a flowchart of FIG. 25. The flowchart of FIG. 25 starts, for example, when an ignition power supply of the subject vehicle is turned ON.

Firstly in S121, a necessity determination portion 14 determines whether the subject vehicle reaches a tunnel where the subject vehicle should speed up. A tunnel where the subject vehicle should speed up means a tunnel having a long moderate uphill and therefore having a tendency that a vehicle speed decreases more than necessary.

The fourth embodiment will be described on the assumption that a map DB 7 includes link data on the basis of which a tunnel where the subject vehicle should speed up can be identified. The necessity determination portion 14 determines whether the subject vehicle reaches a tunnel where the subject vehicle should speed up on the basis of the link data included in the map DB 7 and a present location of the subject vehicle specified by a subject vehicle position specifying portion 11.

When the necessity determination portion 14 determines that the subject vehicle reaches a tunnel where the subject vehicle should speed up (YES in S121), advancement is made to S122. On the other hand, when the necessity determination portion 14 determines that the subject vehicle has not reached the tunnel (NO in S121), advancement is made to S130. S121 corresponds to a condition determination portion of the present disclosure.

Processing in S122 through S124 is the same as the processing in S102 through S104 described above.

In S125, the necessity determination portion 14 determines whether the subject vehicle is accelerated in a desirable manner in the tunnel where the subject vehicle should speed up. For example, a desirable travel speed in a tunnel where the subject vehicle should speed up may be in advance stored in a non-volatile memory of the HCU 1b. The necessity determination portion 14 thus determines that the subject vehicle is accelerated in a desirable manner when the travel speed is increased to the pre-stored desirable travel speed. When the necessity determination portion 14 determines that the subject vehicle is accelerated in a desirable manner (YES in S125), advancement is made to S126. On the other hand, when the necessity determination portion 14 determines that the subject vehicle is not decelerated in a desirable manner (NO in S125), advancement is made to S128. S125 corresponds to a behavior determination portion of the present disclosure.

In S126, the display control portion 18 ends a display of the arrow mark illusion image by directing a HUD 4 to end the display of the arrow mark illusion image and advancement is made to S127.

In S127, the necessity determination portion 14 determines whether the subject vehicle passed the tunnel where the subject vehicle should speed up on the basis of the link data included in the map DB 7 and a present location of the subject vehicle specified by the subject vehicle location portion 11. When the necessity determination portion 14 determines that the subject vehicle passed the tunnel where the subject vehicle should speed up (YES in S127), advancement is made to S130. On the other hand, when the necessity determination portion 14 determines that the subject vehicle has not passed the tunnel (NO in S127), the necessity determination portion 14 repeats the processing in S127. When the necessity determination portion 14 determines that the subject vehicle has not passed the tunnel where the subject vehicle should speed up, the necessity determination portion 14 may determine whether the subject vehicle falls below the desirable speed in the tunnel where the subject vehicle should speed up to display the arrow mark illusion image again in a case where the subject vehicle falls below the desirable speed.

In S128 to which advancement is made when the necessity determination portion 14 determines in S125 that the subject vehicle is not accelerated in a desirable manner, a pre-generation setting portion 16 sets a spacing wider than the spacing set before among the arrow marks aligned intermittently in a travel direction of the subject vehicle.

In S129, the necessity determination portion 14 determines whether the subject vehicle passed the tunnel where the subject vehicle should speed up as in S127. When the necessity determination portion 14 determines that the subject vehicle passed the tunnel where the subject vehicle should speed up (YES in S129), advancement is made to S130. On the other hand, when the necessity determination portion 14 determines that the subject vehicle has not passed the tunnel (NO in S129), the flow is returned to S123 to repeat the processing.

By returning to S123 and repeating the processing, the arrow mark illusion image showing the arrow marks spaced wider than in the arrow mark illusion image before is displayed. Hence, when the subject vehicle is not accelerated in a desirable manner in the tunnel where the subject vehicle should speed up, the spacing among the arrow marks in the arrow mark illusion image is widened gradually while the subject vehicle is moving forward.

When a determination is made in S130 that it is timing to end the display control related processing (YES in S130), the display control related processing is ended as in S9 described above. On the other hand, when it is not timing to end the display control related processing (NO in S130), the flow is returned to S121 to repeat the processing.

(Outline of Fourth Embodiment)

When a spacing among the arrow marks aligned intermittently in the travel direction of the subject vehicle as if the arrow marks were painted on the tunnel wall surface is widened gradually while the subject vehicle is moving forward, the driver has an optical illusion appearing that a vehicle speed of the subject vehicle decreases. Normally, the driver is more likely to accelerate the subject vehicle instinctively when the driver feels that the subject vehicle is moving slower.

In the fourth embodiment, the arrow marks aligned intermittently in the travel direction of the subject vehicle are displayed in such a manner that it appears to the driver that the arrow marks are actually painted on the tunnel wall surface and that a spacing among the arrow mark widens gradually while the subject vehicle is moving forward. Hence, the driver has an optical illusion appearing that a vehicle speed of the subject vehicle decreases and is therefore highly likely to accelerate the subject vehicle instinctively. In the fourth embodiment, by displaying the illusion image in the manner described as above when the subject vehicle reaches a tunnel where the subject vehicle should speed up, the driver is successfully led to accelerate the subject vehicle in a tunnel where the subject vehicle should speed up. Consequently, the occurrence of jamming can be prevented in a tunnel having a long moderate uphill and therefore having a tendency that a vehicle speed decreases more than necessary.

Also, according to the fourth embodiment, the arrow mark illusion image is not displayed when the subject vehicle is accelerated to a desirable speed in the tunnel where the subject vehicle should speed up. Hence, the fourth embodiment can eliminate annoyance the driver may feel with the arrow mark illusion image displayed even when the subject vehicle is accelerated to a desirable speed in a tunnel where the subject vehicle should speed up.

(Thirteenth Modification)

The third and fourth embodiments have described the configuration to display the arrow mark illusion image which makes it appear that the arrow marks are aligned intermittently along the wall surface. However, the present disclosure is not limited to the configuration as above. For example, it may be configured in such a manner that an arrow mark illusion image makes it appear that the arrow marks are aligned intermittently on a road surface in a travel direction. The alternative configuration is applicable to a case where the subject vehicle is travelling in the slowdown region described above and a region where the subject vehicle should speed up other than the examples described above, namely, a road along which walls, such as soundproof walls, are erected and a tunnel.

(Fourteenth Modification)

The third and fourth embodiments above have described the configuration to display the arrow mark illusion image in which the arrow marks are aligned on the tunnel wall surface detected using the range sensor 9. However, the present disclosure is not limited to the configuration as above. For example, a position of the tunnel wall surface may not be detected. Instead, a position of a virtual wall surface on the assumption that the subject vehicle is travelling in a tunnel having a predetermined width may be stored in advance. In such a case, an arrow mark illusion image in which the arrow marks are aligned along the virtual wall surface may be display by default. The arrow mark illusion image may be generated and displayed in succession by successively bending a direction in which the arrow marks are aligned according to a steering angle of the subject vehicle detected by a steering angle sensor (not shown).

(Fifteenth Modification)

The third and fourth embodiments above have described the configuration to display the arrow mark illusion image in which the arrow marks are aligned. However, the present disclosure is not limited to the configuration as above. Marks of any shape other than the arrow shape aligned intermittently in the travel direction of the subject vehicle can be used as well.

(Sixteenth Modification)

The embodiments above have described the configuration that uses the map DB 7. However, the map DB 7 may be a map DB of an in-vehicle navigation device. Alternatively, the map DB 7 may be a map DB of a portable terminal connectable by wireless communication or by cable or a map DB of a server provided outside the subject vehicle and connectable by wireless communication.

According to the vehicle display control apparatus of the present disclosure, an object that does not actually exist on a road surface under circumstances where a predetermined condition is satisfied is generated as an illusion image, and the illusion image is displayed when the predetermined condition is satisfied. A driver who sees such an illusion image cannot help but behave instinctively in a desirable manner for road traffic under circumstances where the predetermined condition is satisfied. Hence, the driver is successfully led to a desirable behavior for road traffic with the use of a head-up display device.

It is noted that a flowchart or the processing of the flowchart in the present application includes multiple steps (also referred to as sections), each of which is represented, for instance, as S1. Further, each step can be divided into several sub-steps while several steps can be combined into a single step.

In the embodiments above, the respective portions are provided separately inside the HCU 1, 1a, and 1b according to the functions furnished to the HCU 1, 1a, and 1b for ease of description. However, it does not mean that the HCU 1, 1a, and 1b are physically divided to the respective portions.

Incidentally, it is to be understood that the present disclosure is not limited to the above described embodiments.

The present disclosure can be modified variously within a scope described in the present disclosure, and any embodiment obtained by appropriately combining technical manners disclosed in different embodiments is included in the technical scope of the present disclosure.

The invention claimed is:

1. A vehicle display control apparatus mounted on a vehicle, comprising:
a controller that includes
a display control portion configured to control a head-up display device displaying an image by superimposing the image on a view visible to a driver of the vehicle through a windshield of the vehicle, and
a condition determination portion configured to determine whether a condition under which the vehicle should slow down is satisfied,
wherein:
the display control portion is configured to cause, based on a determination of the condition determination portion that the condition under which the vehicle should slow down is satisfied, the head-up display device to display an object that does not actually exist on a road under circumstances where the condition is satisfied, as an illusion image that produces an optical illusion appearing that a road surface viewed from the driver moves faster than an actual speed of the vehicle in an opposite direction to a travel direction of the vehicle by superimposing the illusion image on the view visible to the driver through the windshield.

2. The vehicle display control apparatus according to claim 1, wherein:
the display control portion successively displays the illusion image to produce the optical illusion continuously, based on the determination of the condition determination portion that the condition is satisfied.

3. The vehicle display control apparatus according to claim 2, further comprising:
a behavior determination portion configured to determine whether the driver performs a desirable behavior for road traffic under the circumstances where the condition is satisfied,
wherein:
the display control portion does not display the illusion image when the behavior determination portion determines that the driver performs the desirable behavior for road traffic under the circumstances where the condition is satisfied.

4. The vehicle display control apparatus according to claim 1, further comprising:
a slowdown degree specifying portion configured to specify a degree at which the vehicle should slow down,
wherein:
when the display control portion displays the illusion image that produces the optical illusion appearing that the road surface viewed from the driver moves faster than the actual speed of the vehicle in the opposite direction to the travel direction of the vehicle,
the display control portion displays the illusion image appearing that the road surface viewed from the driver moves in the opposite direction to the travel direction of the vehicle at a higher speed as the degree of slowdown specified by the slowdown degree specifying portion increases.

5. The vehicle display control apparatus according to claim 1, wherein:
the display control portion displays the illusion image appearing as marks, each of the marks becomes shorter in a vehicle width direction as the marks move in the travel direction of the vehicle and are aligned intermittently along the road surface in the travel direction of the vehicle, move in the opposite direction to the travel direction of the vehicle, and the display control portion produces the optical illusion appearing that the road surface viewed from the driver moves faster than the actual speed of the vehicle in the opposite direction to the travel direction of the vehicle.

6. The vehicle display control apparatus according to claim 5, wherein:
the display control portion displays the marks intermittently aligned so that the marks appear to be aligned on a lane boundary of a lane the vehicle is travelling.

* * * * *